United States Patent
Morita et al.

(10) Patent No.: US 10,346,371 B2
(45) Date of Patent: Jul. 9, 2019

(54) DATA PROCESSING SYSTEM, DATABASE MANAGEMENT SYSTEM, AND DATA PROCESSING METHOD

(71) Applicant: Hitachi, Ltd., Tokyo (JP)

(72) Inventors: Yuusuke Morita, Tokyo (JP); Yukio Nakano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 341 days.

(21) Appl. No.: 15/305,442

(22) PCT Filed: Jul. 11, 2014

(86) PCT No.: PCT/JP2014/068579
§ 371 (c)(1),
(2) Date: Oct. 20, 2016

(87) PCT Pub. No.: WO2016/006098
PCT Pub. Date: Jan. 14, 2016

(65) Prior Publication Data
US 2017/0046363 A1    Feb. 16, 2017

(51) Int. Cl.
| | | |
|---|---|---|
| *G06F 17/30* | (2006.01) | |
| *G06F 16/21* | (2019.01) | |
| *G06F 16/25* | (2019.01) | |
| *G06F 9/50* | (2006.01) | |
| *G06F 16/00* | (2019.01) | |

(52) U.S. Cl.
CPC .............. *G06F 16/21* (2019.01); *G06F 9/505* (2013.01); *G06F 16/00* (2019.01); *G06F 16/25* (2019.01)

(58) Field of Classification Search
CPC ...................................... G06F 17/30
USPC ......................................................... 707/736
See application file for complete search history.

(56) References Cited

U.S. PATENT DOCUMENTS 7,577,694 B2 * 8/2009 Nakano ................. G06F 16/284
7,831,772 B2 * 11/2010 Nalawade ........... G06F 12/0871
707/736

(Continued)

FOREIGN PATENT DOCUMENTS

JP    2010-511925 A    4/2010

OTHER PUBLICATIONS

International Search Report of PCT/JP2014/068579 dated Nov. 4, 2014.

*Primary Examiner* — Kim T Nguyen
(74) *Attorney, Agent, or Firm* — Mattingly & Malur, PC

(57) ABSTRACT

A DBMS manages a database including a structured data group capable of communicating with a plurality of execution nodes that manage an unstructured data group and execute parallel distributed processing. Each of the plurality of execution nodes is capable of creating data to be processed based on at least one structured data of the structured data group managed by the DBMS and at least one unstructured data of the unstructured data group managed by the plurality of execution nodes, and performing processing using the data to be processed. Based on control information (information about controlling the provision of two or more structured data designated in a reference request sent to the DBMS), the two or more structured data are acquired by the DBMS from the database, and provided from the DBMS to two or more execution nodes among the plurality of execution nodes.

14 Claims, 20 Drawing Sheets

(56) References Cited

U.S. PATENT DOCUMENTS

| | | | | |
|---|---|---|---|---|
| 7,991,775 | B2* | 8/2011 | MacNaughton | G06F 16/2343 707/736 |
| 8,285,710 | B2* | 10/2012 | Bent | G06F 16/2471 707/716 |
| 8,452,755 | B1* | 5/2013 | Ye | G06F 16/38 707/715 |
| 8,510,302 | B2* | 8/2013 | Sweeney | G06N 5/02 707/736 |
| 8,626,747 | B2* | 1/2014 | Bent | G06F 16/2471 707/716 |
| 8,688,684 | B2* | 4/2014 | Steiner | H04M 3/5233 707/713 |
| 8,725,730 | B2* | 5/2014 | Keeton | G06F 16/2462 707/736 |
| 10,019,473 | B2* | 7/2018 | McClary | G06F 16/2282 |
| 2008/0086442 | A1 | 4/2008 | Dasdan et al. | |
| 2008/0114724 | A1 | 5/2008 | Indeck et al. | |

* cited by examiner

6001 Expansion request

```
// [1] Read driver
    Connection con = DriverManager.getConnection( url, user, password );
// [2] CoupleDBMS
    PreparedArrangeStatement st = con.preparedArrangeStatement ( "SELECT * FROM item" );
// [3] Placement information
    st.SetPosition;
// [4] Acquisition and placement of data
    st.executeArrange();
```

FIG. 7

521 First placement information

```
<NODE>
    <NO> 1 </NO>
    <IP> 100.1.1.1 </IP>
    <PORT> 30001 </PORT>
    <DATA>
        <TABLE> item </TABLE> <COLMUN> category </COLMUN> <VALUE> microwave ovens </VALUE>
    </DATA>
</NODE>

<NODE>
    <NO> 2 </NO>
    <HOST> SLAVE2 </HOST>
    <DATA>
        <TABLE> item </TABLE> <COLMUN> category </COLMUN> <VALUE> microwave ovens </VALUE>
    </DATA>
</NODE>

<NODE>
    <NO> 3 </NO>
    <HOST> SLAVE3 </HOST>
    <PORT> 29999 </PORT>
    <DATA>
        <TABLE> item </TABLE> <COLMUN> category </COLMUN> <VALUE> refrigerator </VALUE>
    </DATA>
</NODE>

<NODE>
    <NO> 32 </NO>
    <IP> 100.1.1.32 </IP>
    <HOST> SLAVE32 </HOST>
</NODE>
```

FIG. 8

| NO | IP | HOST | PORT | TABLE | COLUMN | VALUE |
|---|---|---|---|---|---|---|
| 1 | 100.1.1.1 |  | 30001 | item | category | microwave ovens |
| 2 | 100.1.1.2 | SLAVE2 | 30000 | item | category | microwave ovens |
| 3 | 100.1.1.3 | SLAVE3 | 29999 | item | category | refrigerator |
| ... | ... | ... | ... | ... | ... | ... |
| 32 | 100.1.1.32 | SLAVE32 | 30000 |  |  |  |

522 Second placement information

FIG. 9

| itemID | category | maker | price | stock |
|---|---|---|---|---|
| 000001 | microwave ovens | Company A | 30,000 | 10 |
| 000002 | microwave ovens | Company A | 50,000 | 20 |
| 000003 | microwave ovens | Company B | 45,000 | 7 |
| 000004 | refrigerator | Company B | 120,000 | 5 |
| 000005 | microwave ovens | Company C | 50,000 | 35 |
| 000006 | microwave ovens | Company A | 80,000 | 10 |
| 000007 | refrigerator | Company C | 110,000 | 15 |
| 000008 | rice cooker | Company A | 25,000 | 25 |
| 000009 | refrigerator | Company A | 65,000 | 6 |
| 000010 | microwave ovens | Company D | 12,000 | 15 |
| ... | ... | ... | ... | ... |
| 000050 | rice cooker | Company C | 10,000 | 20 |
| 000051 | refrigerator | Company B | 110,000 | 10 |
| ... | ... | ... | ... | ... |
| 000100 | rice cooker | Company D | 6,000 | 22 |
| ... | ... | ... | ... | ... |

901 Item table

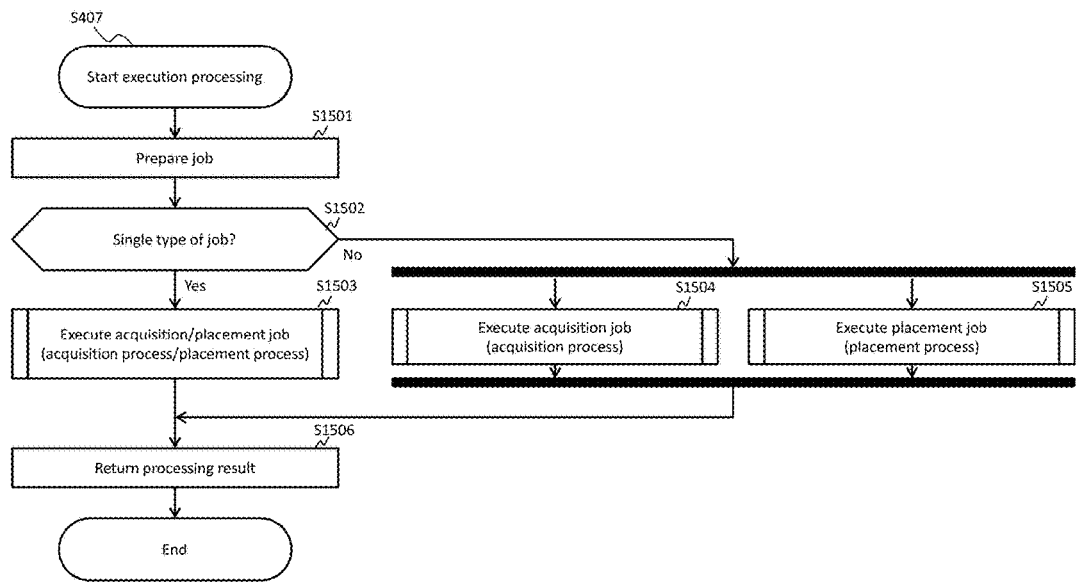

FIG. 18

| TABLEID | TABLE | COLUMN | VALUE |
|---|---|---|---|
| T1 | item | category | microwave ovens |
| T2 | item | category | microwave ovens |
| T3 | item | category | refrigerator |
| ... | ... | ... | ... |
| T32 | | | |

522B
Second preparation information

FIG. 20

| itemID | category | maker | price | stock |
|---|---|---|---|---|
| 000001 | microwave ovens | Company A | 30,000 | 10 |
| 000003 | microwave ovens | Company B | 45,000 | 7 |
| 000006 | microwave ovens | Company A | 80,000 | 10 |
| ... | ... | ... | ... | ... |

2011, 2012, 2013, 2014, 2015

2000 Temporary table

FIG. 22

| NO | IP | CPU | ... | NETWORK |
|---|---|---|---|---|
| 1 | 100.1.1.1 | 10 | ... | 12.5 |
| 2 | 100.1.1.2 | 30 | ... | 15.0 |
| 3 | 100.1.1.3 | 50 | ... | 55.5 |
| ... | ... | ... | ... | ... |
| 32 | 100.1.1.32 | 5 | ... | 10.0 |

2201 Load information

FIG. 23

| NO | IP | HOST | PORT | RATIO |
|---|---|---|---|---|
| 1 | 100.1.1.1 |  | 30001 | 4 |
| 2 | 100.1.1.2 | SLAVE2 | 30000 | 4 |
| 3 | 100.1.1.3 | SLAVE3 | 29999 | 2 |
| ... | ... | ... | ... | ... |
| 32 | 100.1.1.32 | SLAVE32 | 30000 | 3 |

522C Second placement information

| NO | IP | HOST | PORT | RATIO | JOBID |
|---|---|---|---|---|---|
| 1 | 100.1.1.1 | | 30001 | 4 | 00000001 |
| 2 | 100.1.1.2 | SLAVE2 | 30000 | 4 | 00000002 |
| 3 | 100.1.1.3 | SLAVE3 | 29999 | 2 | 00000003 |
| ... | ... | ... | ... | | ... |
| 32 | 100.1.1.32 | SLAVE32 | 30000 | 3 | 00000032 |

1400C
Placement job correspondence table

DATA PROCESSING SYSTEM, DATABASE MANAGEMENT SYSTEM, AND DATA PROCESSING METHOD

TECHNICAL FIELD

This invention generally relates to data processing and particularly distributed processing.

BACKGROUND ART

Every organization manages a business data group, which is a set of a plurality of business data, and the business data group is classified roughly into an unstructured data group, which is a set of a plurality of unstructured data, and a structured data group, which is a set of a plurality of structured data. The proportion of the unstructured data group in the business data group is said to be generally by far greater than that of the structured data group (approximately 80% of the business data group is said to be the unstructured data group). However, the unstructured data group is often left in a file server or the like without being used immediately after it has been created. In addition to such circumstances, as the number of unstructured data groups to be accumulated in the organization or the like continues to increase, unstructured data groups need to be analyzed for secondary business use.

Unfortunately, it is difficult to conduct meaningful business analysis using unstructured data alone.

Therefore, business analysis is known to be carried out using structured data in addition to unstructured data ("combined analysis," hereinafter). Combined analysis is generally not typical but atypical. In atypical analysis, for example, meaningful data is searched out from a large business data group and utilized for the analysis. Specifically, for example, various types of data are combined to create new data for analysis and meaningful data is searched out from the created data.

Distributed file system is generally used for managing unstructured data groups. Distributed file system is a system where groups of folders on a plurality of computers coupled by a network are handled as subfolders of a single shared folder, allowing any of the plurality of computers to access the groups of folders. In this system, by constructing a virtual structure different from the actual folder structure, files and folders that are distributed appear as if these files and folders are managed by a single computer. Distributed file system is generally incorporated in a parallel distributed processing infrastructure that is capable of executing a distributed process using files (data) managed by the distributed file system (e.g., Hadoop). A programming model such as MapReduce in which analytical processing on data is simplified into group extraction processing (Map processing) and data aggregation processing (Reduce processing) has been known as a parallel processing technique (for example, PTL 1).

On the other hand, a database is generally used for managing structured data groups. A database is managed by a database management system ("DBMS," hereinafter).

Therefore, in developing an analysis application for acquiring necessary data from a structured data group and an unstructured data group for the purpose of combined analysis, the analysis application needs to access both the DBMS and the parallel distributed processing infrastructure (distributed file system), requiring the developer of the analysis application to have deep knowledge about the both systems (the DBMS and the parallel distributed processing infrastructure (distributed file system)). Moreover, the analysis application needs to include a function of combining unstructured data and structured data to create data for analysis. Especially in an atypical analytical task, it is not always the case that the data for analysis can be created using specific data according to a certain combining method. Files (data) to be handled are not limited to the specific files (data), and the combining method needs to be changed dynamically, depending on the formats of the files (data). For these reasons, the costs of developing an analysis application are high (i.e., burden on the developer is high).

CITATION LIST

Patent Literature

[PTL 1]
US 2008/0086442

SUMMARY OF INVENTION

Technical Problem

The use of either a DBMS or a parallel distributed processing infrastructure is considered for performing the combined analysis, especially the use of a parallel distributed processing infrastructure. Parallel distributed processing is a software foundation for efficiently performing distributed processing on a large amount of data, wherein high-speed analytical processing on a large amount of data can be realized by arranging a large number of computers ("execution nodes," hereinafter) and performing parallel processing on the data. The analysis application developer who uses such a parallel distributed processing infrastructure does not need to be conscious about what types of execution nodes are present or how the distributed processing is performed between the execution nodes, leading to a reduction in the costs of developing the analysis application.

However, this unnecessity to be conscious about what types of execution nodes are present or how the distributed processing is performed between the execution nodes, can contribute to a reduction in the costs of developing the analysis application, but causes a delayed response of the analysis application. In particular, the atypical analysis needs to experiment with various combinations of different types of data within a short period of time, possibly further delaying a response of the analysis application.

This type of problem can occur in processing a request from an application other than the analysis application (i.e., processing other than analytical processing).

Solution to Problem

A DBMS that manages a database including a structured data group is capable of communicating with a plurality of execution nodes that manage an unstructured data group and execute parallel distributed processing. Each of the plurality of execution nodes is capable of creating data to be processed, based on received structured data (an example of at least one of the structured data of the structured data group managed by the DBMS) and target unstructured data (an example of at least one of the unstructured data of the unstructured data group managed by the plurality of execution nodes), and performing processing using the data to be processed. Based on control information (information about controlling the provision of two or more structured data designated in a reference request sent to the DBMS), the two or more structured data are acquired by the DBMS from the database and provided from the DBMS to two or more execution nodes among the plurality of execution nodes.

Note that the foregoing term "received structured data" may mean structured data placed from the DBMS or structured data that are transmitted from the DBMS in response to a transmission request transmitted from execution nodes to the DBMS. The term "target unstructured data" may be the unstructured data to be combined with the received structured data (unstructured data necessary for creating data for analysis). The term "two or more execution nodes" may be all or some of the "plurality of execution nodes."

Advantageous Effects of Invention

Reduction in the costs of developing an application and high processing performance (high-speed response of the application) can be realized.

BRIEF DESCRIPTION OF DRAWINGS

FIG. 7 shows an example of first placement information.

FIG. 8 shows an example of second placement information.

FIG. 9 shows an example of an item table that includes row data acquired according to a reference request in the expansion request of FIG. 6.

FIG. 12 shows an example of placement job correspondence table.

FIG. 13 shows a flow of an execution process (S407 of FIG. 4).

FIG. 18 shows an example of second preparation information according to Embodiment 2.

FIG. 20 shows an example of a temporary table according to Embodiment 2.

FIG. 22 shows an example of load information according to Embodiment 3.

FIG. 23 shows an example of second placement information according to Embodiment 3.

DESCRIPTION OF EMBODIMENTS

Several examples are described hereinafter with reference to the drawings.

In the following description, numbers, names and the like are used as the IDs (identification information) of various targets (such as an enclosure, a port), and these names, numbers and the like are mutually substitutable or other types of information may be used in place of or in addition to at least one of these names, numbers and the like.

In the following description, a process is described with "program" as the subject of each sentence. However, since a program is executed by a processor (such as a CPU (Central Processing Unit) to perform a certain process using a storage resource (such as a memory) and/or a communication interface device (such as a communication port) appropriately, the subject of each sentence describing a process may be "processor" (or "an apparatus with a processor"). A process that is explained with "program" as the subject of its sentence may be performed by a processor or an apparatus with a processor (a computer, a storage apparatus, etc.). The processor may include a hardware circuit that executes part or the entire process. The program may be installed from a program source onto each controller. The program source may be, for example, a program distribution computer or a storage medium.

In the following description, the term "structured data" means structurally defined data. Structured data may be in the form of a schema such as a table or an index (e.g., tables of client data, accounting data, product data, stock data, etc.) or components of a schema such as values shown in a table or index.

On the other hand, the term "unstructured data" means data that are not defined structurally (e.g., data that are classified into data models incompatible mainly with a relational model). For example, unstructured data may be digital contents such as text data of a report or the like, electronic mail, and social media, calls recorded by a call center, and the like. Unstructured data may also be part of at least one of these data. Unstructured data may be in the form of, for example, a file. Data that are not totally defined structurally are often called "semistructured data." However, in the present specification, data other than structured data are unstructured data, and structured data are managed by a database, while unstructured data are managed by a parallel distributed processing infrastructure. In other words, in the present specification, data that are handled in an analytical process are classified roughly into structured data and unstructured data.

Embodiment 1

Figure 1:
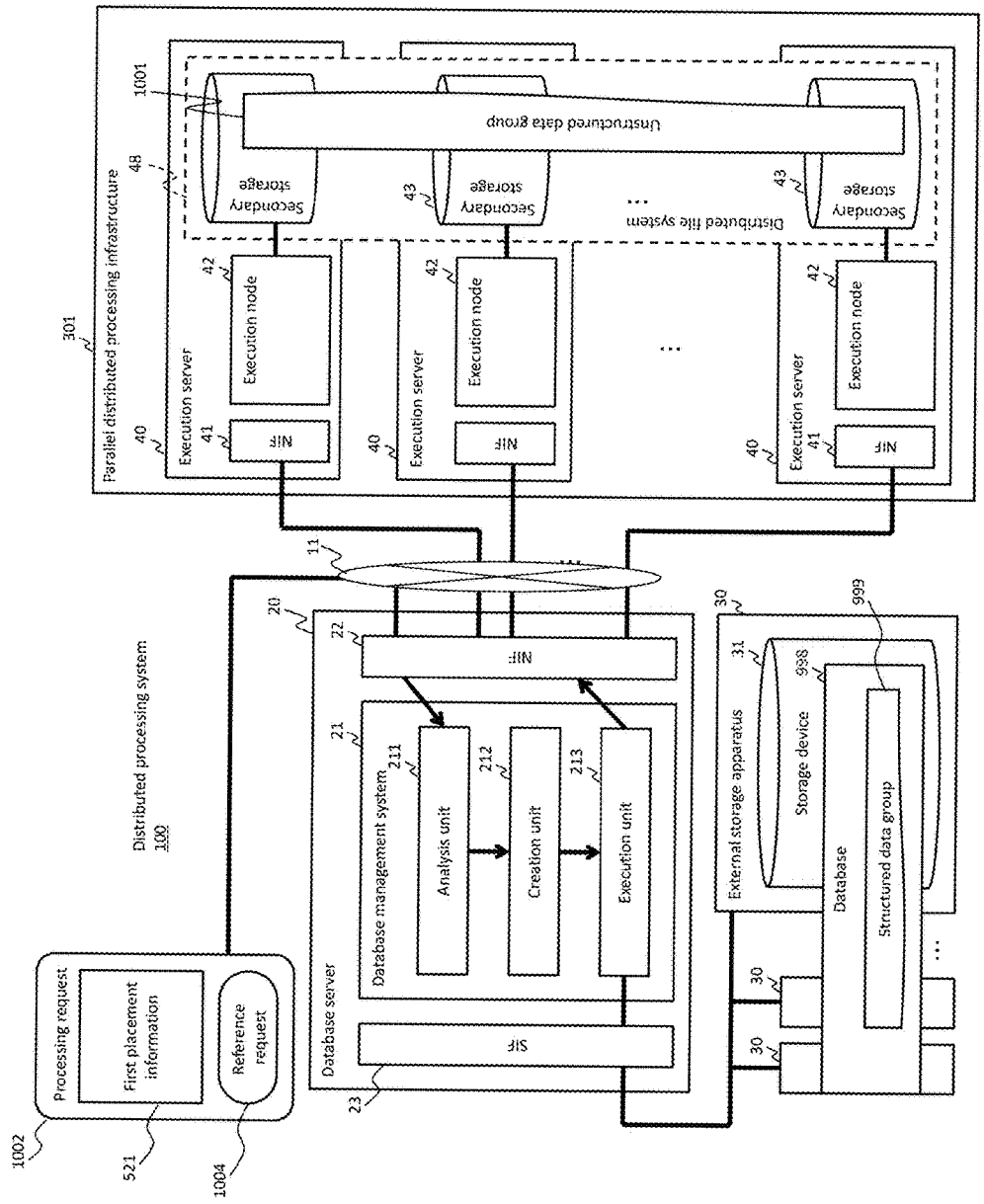
FIG. 1 shows an overview of a distributed processing system according to Embodiment 1.

FIG. 1 shows an overview of a distributed processing system according to Embodiment 1.

A distributed processing system 101 is an example of a data processing system and has a database server 20 and a parallel distributed processing infrastructure 301. The parallel distributed processing infrastructure 301 has a plurality of execution servers 40. The plurality of execution servers 40 are coupled in a communicable manner to the database server 20.

The database server 20 has a network interface ("NIF," hereinafter) 22 which is an example of a first interface device, a storage interface ("SIF," hereinafter) 23 which is an example of a second interface device, and a database management system (DBMS) 21. The plurality of execution servers 40 are coupled in a communicable manner to the NIF 22 by, for example, a network 11, and one or more external storage apparatuses 30 in which a database 998 including a structured data group 999 (a plurality of structured data) is stored are coupled in a communicable manner to the SIF 23. Each of the external storage apparatuses 30 has a storage device 31, and the storage device 31 stores a database portion, a part of the database 998. In other words, the database 998 is a set of one or more database portions. The DBMS 21 manages the database 998. The DBMS 21 has an analysis unit 211, a creation unit 212, and an execution unit 213.

The execution servers 40 each have an NIF 41 which is an example of an interface device, an execution node 42, and a secondary storage device 43. The execution nodes 42 each perform an analytical process (e.g., group extraction processing and data aggregation processing). The plurality of secondary storage devices 43 of the plurality of execution servers 40 store an unstructured data group (a set of a plurality of unstructured data) 1001, and the unstructured data group 1001 is managed by a distributed file system 48. Each of the plurality of execution nodes 42 can create data for analysis, based on received structured data and target unstructured data, and perform an analytical process by using the data for analysis.

The term "server" means an example of an entity based on a physical computer resource. For example, a server is an example of a computer, and a computer may be a physical computer having physical computer resources (e.g., a physical storage device, a physical I/O device, and a physical processor coupled to the physical storage device and physical I/O device), or a virtual computer to which are allocated logical computer resources by logically dividing a physical computer resource. In all of the examples hereinafter, the term "server" means a physical computer (physical server).

The term "node" is also an example of an entity based on a physical computer resource. For example, a node may be an example of a computer (may be synonymous with "server") or a function that is realized by executing a computer program in the computer (server). In all of the examples hereinafter, the term "node" means a function that is realized by executing a computer program in a server.

Overviews of the processes executed in the present embodiment are now described hereinafter.

The DBMS 21 (the analysis unit 211) receives, through the NIF 22, a processing request 1002 that includes a reference request (e.g., a query written in SQL) 1004 and the first placement information 521. The first placement information 521 is information that designates two or more execution nodes 42 as possible placement destinations of two or more structured data that meet a condition designated by the reference request 1004. The first placement information 521 includes information on each of the two or more execution nodes 42 (such as the IP address and port number of each execution node). The reference request 1002 and the first placement information 521 may be received separately (at different times) or the first placement information 521 may be managed by the DBMS 21 beforehand without being received by an outside component (such as a management node, described hereinafter). Alternatively, in place of the first placement information 521, second placement information described hereinafter may be sent from the outside component to the DBMS 21 or managed beforehand by the DBMS 21 (i.e., the first placement information 521 may not be necessary).

The DBMS 21 (the analysis unit 211) analyzes the reference request 1004 and the first placement information 521 and creates the second placement information as a result of the analysis the first placement information 521. The content of the second placement information may be identical to the content of the first placement information. Specifically, the second placement information may include information on the two or more execution nodes 42 obtained as the possible placement destinations of the two or more structured data that meet the condition designated by the reference request 1004 (e.g., the IP address and port number of each execution node). The difference between the first placement information 521 and the second placement information may be an information format. For example, the first placement information 521 may be information in unstructured format such as a text file, and the second placement information may be information in structured format such as a table based on unstructured data. Of the first placement information 521 and the second placement information, at least the second placement information is an example of control information.

Based on the result of the analysis of the reference request 1004, the DBMS 21 (the creation unit 212) creates an execution plan (e.g., query execution plan) which is a procedure of processing the reference request. Specifically, for example, the DBMS 21 determines the number of jobs to be executed and a process to be allocated to each of the plurality of jobs, based on whether or not a condition on a specific attribute out of one or more attributes of structured data is designated by the reference request and whether or not the second placement information includes information about a placement condition on the structured data to be placed in the execution nodes 42. The DBMS 21 then creates an execution plan according to the result of this determination. The jobs may each be executed on a "thread" basis or "process" basis. The jobs include at least one of the followings: an acquisition job for executing an acquisition process for acquiring structured data from the database 988; a placement job for executing a placement process for placing the structured data acquired in the acquisition process into the execution nodes 42 in accordance with the second placement information; and an acquisition/placement job for executing both the acquisition process and the placement process for placing the structured data acquired in the acquisition process. Two or more structured data are acquired through two or more acquisition processes, and two or more different database pages ("pages," hereinafter) are allocated to the two or more acquisition processes respectively (two or more jobs). Therefore, acquisition source pages do not overlap in the two or more acquisition processes. The term "page" (database page) is an example of a database element that is obtained by logically dividing a database based on the value of a specific attribute.

Based on the execution plan, the DBMS 21 (the execution unit 213) executes the job corresponding to the acquisition process for acquiring structured data from the database. In a case where there exist a plurality of the jobs corresponding to the acquisition process (acquisition/placement job or acquisition job), the DBMS 21 (the execution unit 213) executes the plurality of jobs asynchronously and in parallel. The DBMS 21 (the execution unit 213) also executes jobs corresponding to the placement process for placing the acquired structured data, on the execution nodes designated by the execution plan (described in the second placement information). In a case where there exist a plurality of jobs corresponding to the placement process (acquisition/placement jobs or placement jobs), the DBMS 21 (the execution unit 213) executes the plurality of jobs asynchronously and in parallel. The placement process may be executed appropriately without waiting for the completion of acquisition of all the structured data to be acquired (all the structured data that meet the condition designated by the reference request) (e.g., each time a certain amount of structured data is acquired).

Two or more execution nodes 42 of the plurality of execution nodes 42 execute two or more analytical processes in parallel. The data used in the analytical processes are unstructured data, structured data, or a combination of unstructured data and structured data. In a case where only unstructured data are used in the analytical processes, the execution nodes 42 execute the analytical processes using the target unstructured data. In a case where only structured data are used in the analytical processes, the execution nodes 42 execute the analytical processes using the structured data that are placed in the execution nodes 42 by the DBMS 21 (the structured data that are placed in the storage devices of the execution servers 40 having the execution nodes 42). In a case where a combination of unstructured data and structured data is used in the analytical processes, the execution nodes 42 execute the analytical processes with a combination of target unstructured data and placed structured data.

The following two processes are performed in the distributed processing system 101 realized by a cooperation between the DBMS 21 and the parallel distributed processing infrastructure 301.
(Process 1) Preparing data for analysis (placing structured data in the execution nodes)
(Process 2) Distributed analytical process in the two or more execution nodes 42

Improvement in performance of an analysis application (high-speed response) can eventually be expected by speeding up these two processes.

The DBMS 21 executes the structured data acquisition process and the placement process for placing the acquired structured data in the execution nodes, in parallel and asynchronously based on the reference request 1004 and the second placement information. In this manner, the processing time it takes for the structured data conforming to the reference request 1004 to be divided into two or more execution nodes and placed therein can hopefully be reduced (this process can be sped up). Consequently, improvement in performance of (process 1) is expected.

Furthermore, based on the second placement information, the DBMS 21 can directly place structured data (e.g., row data including value A) in an execution node 42 that has received a certain analysis request (e.g., a request for "executing the analysis using the data including value A"). This improves the access performance to the structured data when the execution node 42 executes the analytical process. Specifically, for example, inter-execution-node communication where the execution nodes exchange the structured data can be prevented from happening. Consequently, improvement of the performance of (process 2) is expected.

It is conceivable that the distributed processing system 101 (for example, the distributed file system 48 and the parallel distributed processing infrastructure 301 in particular) stores copies of the data to be analyzed (structured data and unstructured data) in a plurality of execution nodes 42 in order to ensure reliability (e.g., dealing with system failure, improving analytical performance). In some cases the copies (including the original) are stored in three or more execution nodes 42. According to the present embodiment, the execution nodes 42 can have the structured data for the analytical process placed directly in these execution nodes 42. Thus, although the present invention aims to ensure reliability of the distributed file system 48 and the parallel distributed processing infrastructure 301, having two execution nodes 42 is enough to store the copies of the data (the copies of the original): a currently used execution node 42 and a standby execution node 42. In other words, the present embodiment can reduce the number of hardware resources (storage devices) configuring the distributed processing system.

Figure 2:
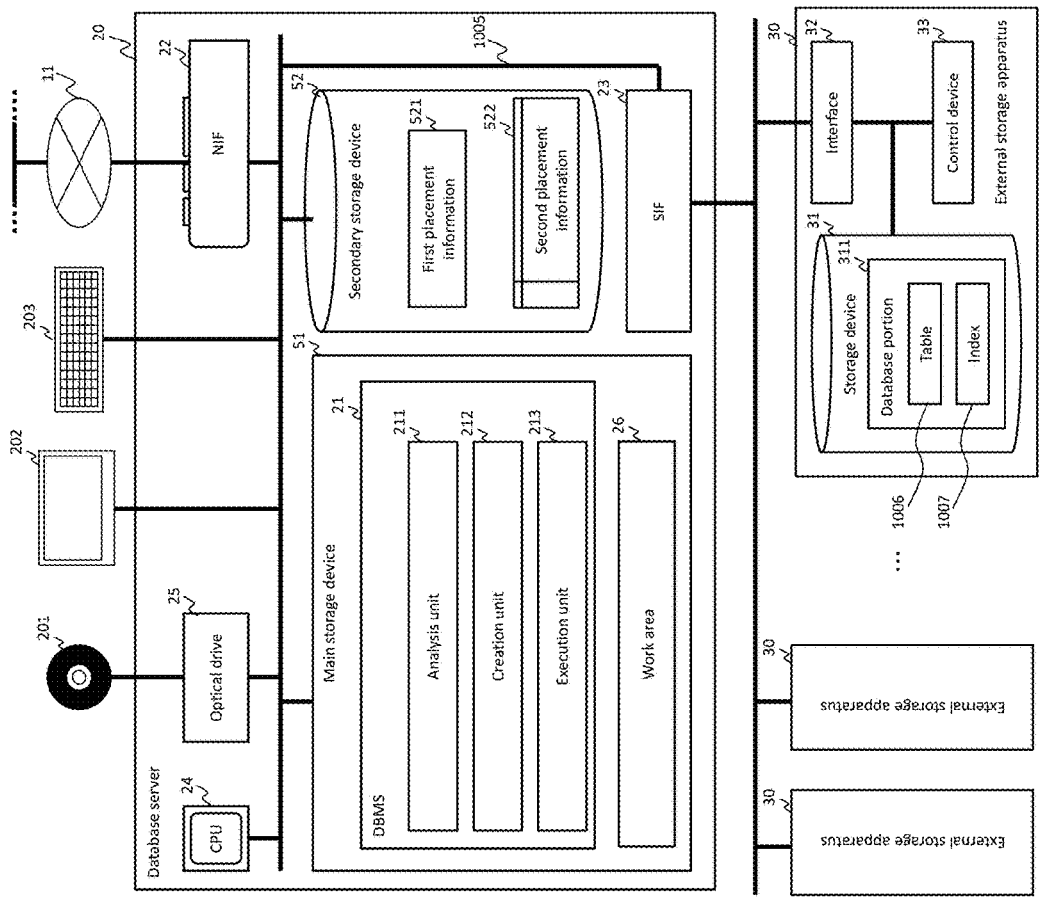
FIG. 2 shows a hardware configuration of a database server.

FIG. 2 shows a hardware configuration of the database server 20.

The database server 20 has the NIF 22, the SIF 23, a main storage device 51, a secondary storage device 52, an optical drive 25, a display device 202, a keyboard 203, and a CPU (Central Processing Unit) 24 coupled to these components by a bus 1005.

The NIF 22, the SIF 23, the optical drive 25, the display device 202, and the keyboard 203 are each an example of an I/O device. The optical drive 25 is capable of reading data from an optical storage medium 201 such as a DVD (Digital Versatile Disk). The display device 202 is an example of an output device and may display at least part of second placement information 522. The keyboard 203 is an example of an input device by which the first placement information may be input manually.

The network 11 is a communication network such as a LAN (Local Area Network), and the NIF 22 is a network interface such as a LANC (LAN controller) for making communication via the LAN.

The main storage device 51 and the secondary storage device 52 are each an example of a storage device. The main storage device 51 is, for example, a volatile (or non-volatile) memory in which the DBMS (the analysis unit 211, the creation unit 212, and the execution unit 213) executed by the CPU 24 are stored. The main storage device 51 also has a work area 26 that is used for temporarily storing data used frequently for executing the process of each processing unit. The secondary storage device 52 is a non-volatile storage device such as an HDD (Hard Disk Drive) or SSD (Solid State Drive). The secondary storage device 52 is for storing the first placement information 521 input from the outside and the second placement information 522 obtained by converting the first placement information 521 (obtained by changing the format of the first placement information 521 to a tabular format for easy management of the first placement information 521 in the DBMS 21). The first placement information 521 may be stored in the external storage apparatuses 30. The second placement information 522 may be stored in the main storage device 51 (the work area 26) or in the external storage apparatuses 30.

The SIF 23 is coupled to the external storage apparatus 30 by a network. In a case where the network is a SAN (Storage Area Network), the SIF 23 may be an HBA (Host Bust Adapter). Once the DBMS 21 is executed, an I/O request is issued to the external storage apparatuses 30 through the SIF 23, if needed. The network is, for example, a SAN to which an FC (Fibre Channel) protocol is applied, but may be other type of network. For example, the network may be an IP (Internet Protocol) network for enabling communication between the SIF 23 and the external storage apparatuses 30 through an iSCSI protocol.

The external storage apparatuses 30 store data managed by the database server 20 and input and output the data according to I/O requests from the database server 20. The term "data" here does not always have to be structured data.

The external storage apparatuses 30 each have an interface device 32, the storage device 31, and a control device (processor) 33 coupled to these devices. The interface device 32 is coupled to the network. The control device 33 processes an I/O request issued by the database server 20. The storage device 31 is a non-volatile storage device and stores therein a database portion 311 that manages data read/written according to the I/O requests issued by the database server 20. The database portion 311 is a part of the database 988 (see FIG. 1). The database 988 includes tables and indices, and the database portion 311 includes a table 1006 as one of the tables of the database 988 and an index 1007 as one of the indices of the database 988. The storage device 31 may be a single HDD or SDD, other type of storage device, or a group of storage devices such as a RAID (Redundant Arrays of Inexpensive (or (Independent) Disks) group.

Figure 3:
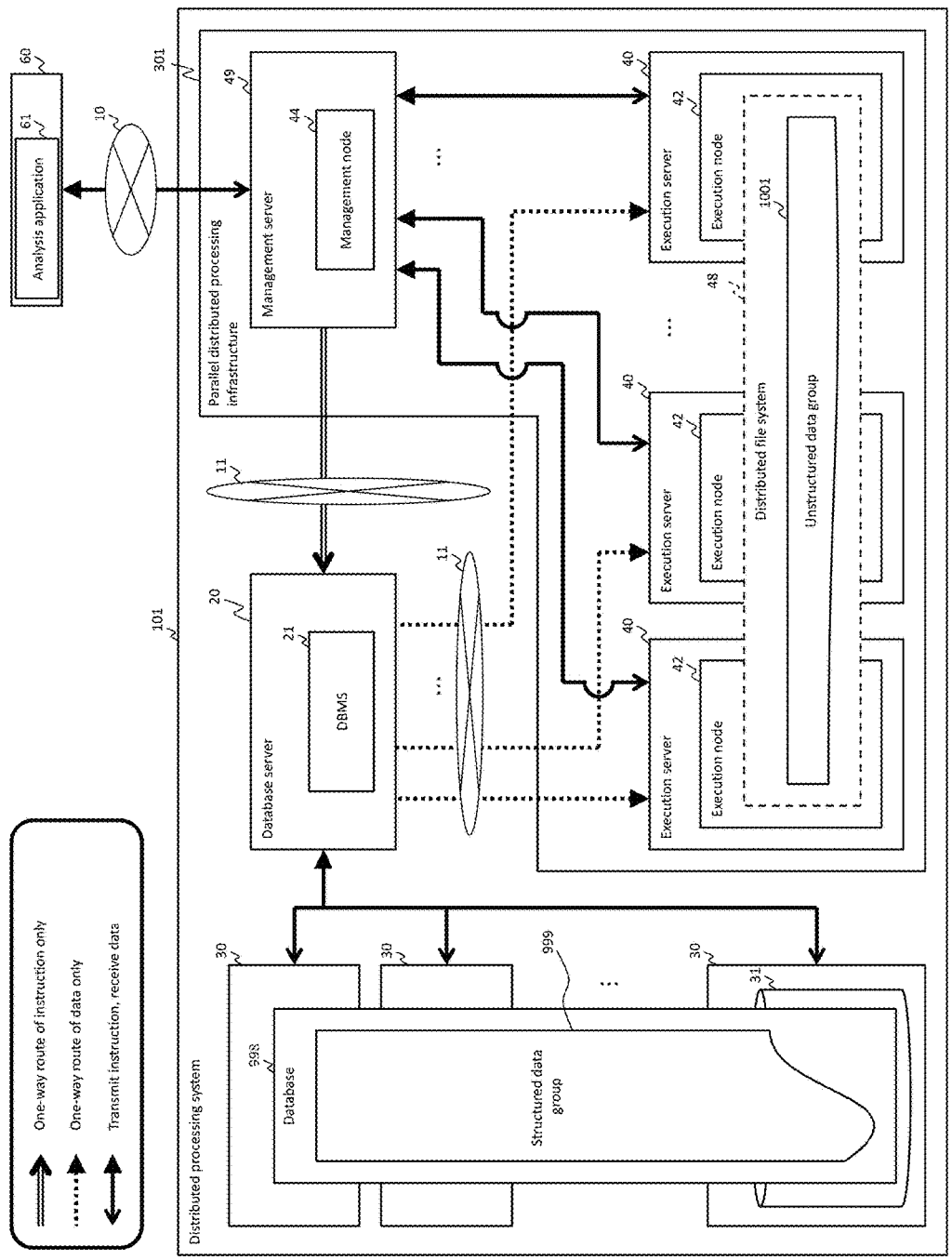
FIG. 3 shows the exchanges of instructions and data between apparatuses in the distributed processing system.
Figure 4:
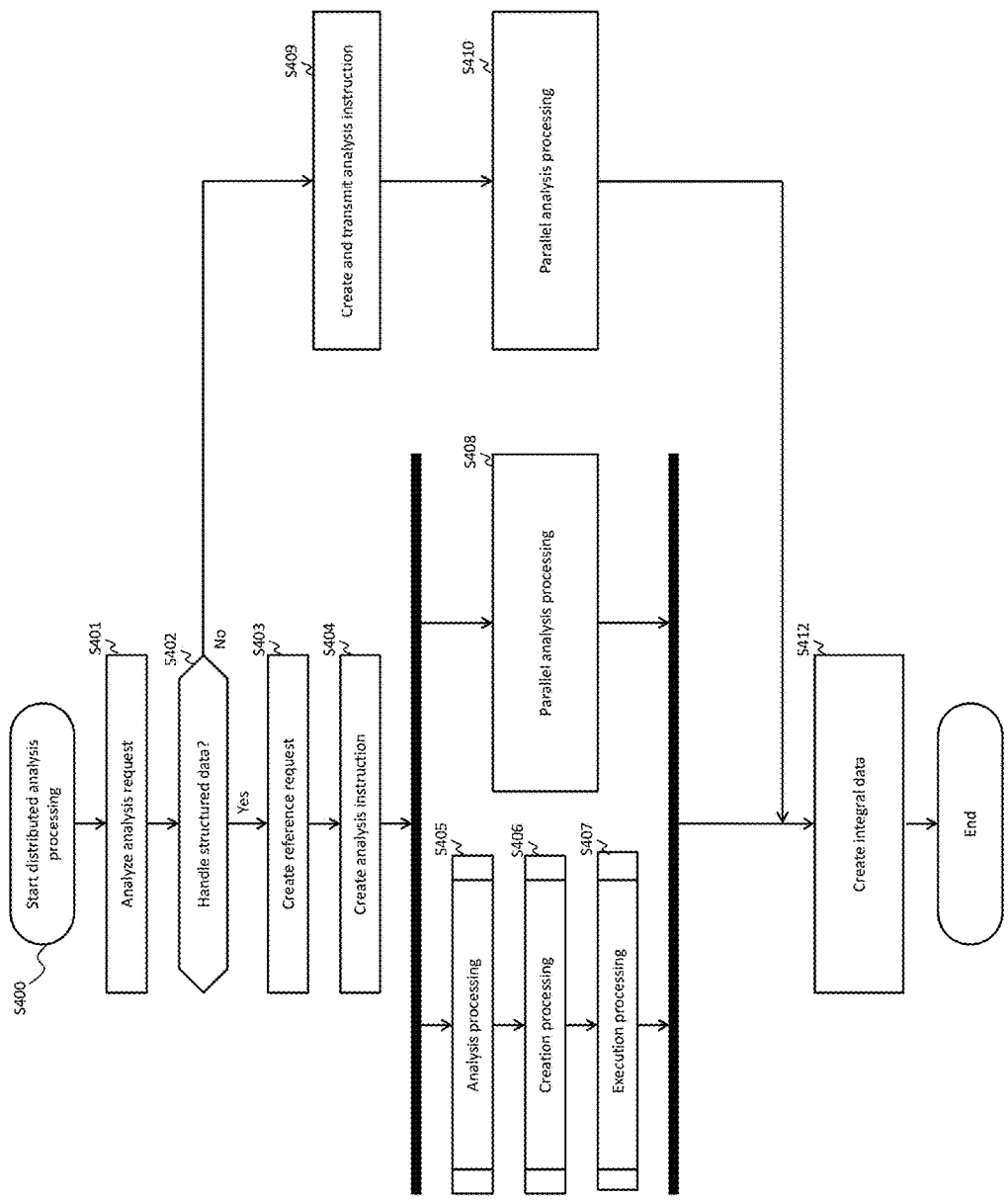
FIG. 4 shows a schematic flow of a distributed analytical process of the distributed processing system.

FIG. 3 shows the exchanges of instructions and data between the apparatuses in the distributed processing system 101. FIG. 4 shows a schematic flow of a distributed analytical process of the distributed processing system 101. A flow of the overall process (the distributed analytical process) of the distributed processing system 101 is described hereinafter with reference to FIGS. 3 and 4.

The parallel distributed processing infrastructure 301 has a management server 49 (management node 44), a server (node) that is coupled to the plurality of execution servers 40 (execution nodes 42) and the database server 20 (DBMS 21). The management server 49 (management node 44) receives an analysis request from an application server 60 (analysis application 61) through a network 10. The application server 60 is a server that executes the analysis application 61. While the management node 44, the execution nodes 42, and the DBMS 21 are executed by a plurality of different servers, at least two of the management node 44, execution nodes 42 and DBMS 21 may be executed by the same server or a plurality of different virtual servers on the same physical server. Note that the management server 49 (management node 44) is not shown in the parallel distributed processing infrastructure 301 of FIG. 1. This is because FIG. 1 is a diagram for explaining an overview of Embodiment 1, which does not need to explain the management server 49 (management node 44).

Once the distributed analytical process begins (S400), the management node 44 analyzes the analysis request (S401 of FIG. 4). Based on the result of the analysis of the analysis request (such as the configuration of the analysis request), the management node 44 determines whether the analysis request is directed to unstructured data only or at least to structured data (S402 of FIG. 4).

In a case where the analysis request is directed to unstructured data only, the result of the determination in S402 is negative (S402: No). Specifically, for example, in a case where one or more unstructured data (inquiry emails or texts sent to the call center) are stored in the distributed file system 48, when the analysis request is about "totaling up the number of inquiries about each of the products that were made to the call center in the past year," the result of the determination in S402 is negative. According to this analysis request, the product names may be extracted from the unstructured data to total up the number of product names with respect to the products. On the other hand, in a case where the analysis request is directed to at least structured data, the result of the determination in S402 is positive (S402: Yes). Specifically, when, for example, the analysis request is about "calculating the profit margin of each product from the number of sales of each product in the past year and the number of inquiries about each of the products that were made to the call center in the past year," the result of the determination in S402 is positive. According to this analysis request, the number of sales of each product may be acquired from the database and the product names may be extracted from the one or more unstructured data (inquiry emails or texts sent to the call center) stored in the distributed file system, to total up the number of product names with respect to the products, and the profit margin per product may be calculated for each product, based on the number of sales of each product (e.g., the number of sales×unit price of each product=total cost) and the number of product names (e.g., the number of product names× predetermined unit price=support cost).

In case of S402: No, the management node 44 creates an analysis instruction for each of the two or more execution nodes 42 and transmits the created analysis instructions (S409). In response to the analysis instructions, the two or more execution nodes 42 perform an analytical process according to the analysis instructions and transmit the results of the analytical process to the management node 44 (S410). The management node 44 integrates the two or more results of the analytical processes received from the two or more execution nodes 42, to create integrated data (the result of processing the analysis request), and transmits the integrated data to the application server 60 (S412).

In case of S402: Yes, the management node 44 creates the reference request 1004 directed to the DBMS 21 and analysis instructions directed to the two or more execution nodes 42 (S403 and S404 of FIG. 4), based on the result of the analysis of the analysis request. Let it be assumed that the management node 44 manages information on the plurality of execution nodes 42 (e.g., information including, for each execution node 42, the IP address, execution node name (host name), port number, file system information (managed unstructured data (e.g., folder name, file name)), and the like) and can create the first placement information 521 based on the information and the result of the analysis of the analysis request. The information on the plurality of execution nodes 42 may be the first placement information 521 themselves. The management node 44 can transmit the processing request 1002 including the reference request 1004 and the first placement information 521 to the DBMS 21. As described above, the management node 44 may transmit the reference request 1004 to the DBMS 21 and thereafter transmit the first placement information 521 to the DBMS 21. In addition, the first placement information 521 or the second placement information 522 may be managed in the DBMS 21 beforehand, and transmitting the first placement information 521 to the DBMS 21 may not be necessary. The first placement information 521 or the second placement information 522 managed beforehand by the DBMS 21 may be updated as appropriate.

The management node 44 transmits the reference request 1004 and the first placement information 521 to the DBMS 21 via a network 11 and transmits the analysis instructions to the two or more execution nodes 42 via the network 11. The network 11 may be the network 10 used in the communication between the application server 60 and the management node 44 or another network independent of the network 10.

In the DBMS 21 that receives the reference request 1004 and the first placement information 521, the analysis unit 211, for example, analyzes the reference request 1004 in performing the analytical process, and creates the second placement information 522 based on the result of this analysis and the first placement information 521 (S405 of FIG. 4). Next, the creation unit 212, for example, creates an execution plan, which is a procedure of processing the reference request 1004, based on the result of the analysis and the second placement information 522 (S406 of FIG. 4), in performing the creation process. The execution unit 213, for example, executes the reference request 1004 based on the execution plan in performing the execution process (S407 of FIG. 4).

Meanwhile, the two or more execution nodes 42 each execute the analytical process in response to the analysis instructions sent from the management node 44 (S408 of FIG. 4). Each of the execution nodes 42 acquires the target unstructured data in the analytical process. If each of the execution nodes 42 needs to handle structured data in order to continue the analytical process, each of the execution nodes 42 waits for the structured data to be placed therein by the DBMS 21. In a case where the structured data are placed by the DBMS 21, each of the execution nodes 42 continues the analytical process (e.g., performs a merging process to merge the structured data and the unstructured data). Each of the execution nodes 42 then transmits the result of the analytical process to the management node 44 in response to its analysis instruction.

In other words, in case of S402: Yes, the management node 44 transmits the reference request 1004 to the DBMS 21. However, in response to the reference request 1004 (the processing request 1002), the management node 44 does not receive the structured data acquired according to the reference request 1004. In response to the reference request 1004 (the processing request 1002), for example, the management node 44 may receive a predetermined type of response (e.g., a response indicating that the reference request 1004 is received or a response indicating whether processing of the reference request 1004 is successful or unsuccessful). The structured data acquired according to the reference request 1004 are placed in the execution nodes 42 by the DBMS 21. The execution nodes 42 each create data for analysis by combining the placed structured data with the acquired unstructured data, and transmit, to the management node 44, the result of analysis according to the data for analysis. In a case where the management node 44 receives the results of the analysis from all of the two or more execution nodes 42 that received the analysis instructions, the management node 44 integrates these analysis results to create integrated data (integral analysis result) and transmits the integrated data to the application server 60 (the analysis application 61) in response to the analysis request (S412 of FIG. 4).

The above has described the flow of the overall process (the distributed analytical process) of the distributed processing system 101.

According to the foregoing flow, the management node 44 receives an analysis request from the analysis application 61 and returns a response on the analysis request to the analysis application, regardless of the content of the data handled in the analytical process (the structured or unstructured data only or both the structured and unstructured data). Therefore, a reduction in the costs of developing the analysis application 61 can be expected.

Moreover, according to the foregoing flow, the structured data are placed directly in the execution nodes 42 by the DBMS 21 without going through the management node 44. Consequently, the time it takes for the management node 44 to receive the analysis result from each execution unit 42 can be reduced, and therefore high analytical performance (high-speed response of the analysis application) can be expected.

Therefore, according to the foregoing flow, both a reduction in the costs of developing the analysis application 61 and high analytical performance (high-speed response of the analysis application 61) can possibly be realized.

The processes performed by the DBMS 21 of the distributed processing system 101 are described hereinafter in detail.

Figures 5, 6:
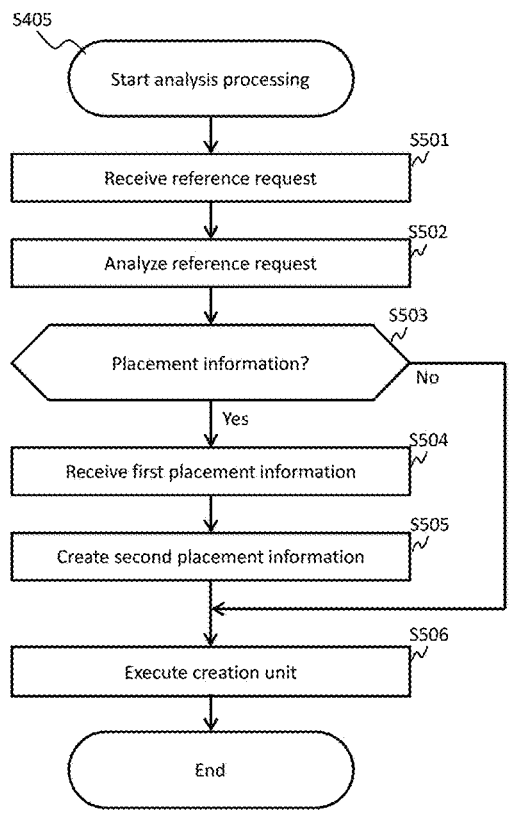
FIG. 5 shows a flow of an analytical process (S405 of FIG. 4).
FIG. 6 shows an example of a part of an expansion request.

FIG. 5 shows a flow of the analytical process (S405 of FIG. 4).

The analysis unit 211 receives the reference request 1004 (S501) and analyzes the received reference request 1004 (S502). Then, based on the result of this analysis, the analysis unit 211 then determines whether to receive the first placement information 521 or not (S503). In a case where the result of the determination in S503 is positive (S503: Yes), the analysis unit 211 receives the first placement information 521 (S504), creates the second placement information 522 based on the first placement information 521 (S505), and executes the creation unit 212 (S506). On the other hand, in a case where the result of the determination in S503 is negative (S503: No), the analysis unit 211 executes the creation unit 212 without performing S504 and S505 (S506).

The analytical process is described hereinafter in detail.

A predetermined API (Application Programming Interface), for example, an API such as a JDBC can be used to transmit a request to the DBMS 21. A request that instructs the execution of the reference request 1004 (e.g., a query written in SQL (SELECT text)) can be created using a class provided by the API such as a JDBC. According to such a general request, the reference request 1004 is executed and the result of the execution of the reference request 1004 (structured data acquired as a result of executing the reference request) is transmitted to the source of the reference request.

In the present embodiment, however, the structured data acquired by executing the reference request 1004 need to be placed in the execution nodes 42 by the DBMS 21. Therefore, the present embodiment uses an expansion request (expanded request) as a request sent to the DBMS 21. FIG. 6 shows an example of a part of the expansion request. An expansion request 6001 is an example of the processing request 1002 described with reference to FIG. 1. In the expansion request 6001 shown in FIG. 6, [2] to [4] are expansion parts (expanded request portions). In other words, the expansion part [2] indicates that the result of the execution of the reference request 1004 only needs to be prepared but does not need to be returned. The reference request 1004 is written in the expansion part [2]. The expansion part [3] indicates that a destination of the result of the execution of the reference request 1004 is not the node that issues this expansion request 6001 (the management node 44, in the present embodiment) but a designated placement destination. The expansion part [4] indicates that the result of the execution of the reference request 1004 needs to be prepared and placed in the designated placement destination. It should be noted that, in response to a request from the management node 44, the DBMS 21 may, for example, return a response that indicates that the processing of the reference request is successful when placement of all the structured data acquired according to the reference request 1004 is completed, return a response that indicates that the processing of the reference request is unsuccessful when acquisition or placement of at least one of the structured data is unsuccessful, or send a time-out error when placement of all the acquired structured data is not completed once a certain period of time elapses since the request is received from the management node 44. The time-out error is considered particularly effective in Embodiment 2 described hereinafter. This is because the structured data are placed in the execution nodes 42 by the DBMS 21 in Embodiment 1 (push type: provision without a request from any of the execution nodes 42), whereas the structured data are transmitted to the execution nodes 42 in response to a transmission request, if the DBMS 21 receives the transmission request from each of the execution nodes 42 in Embodiment 2 (pull type: provision associated with a request from each of the execution nodes 42).

In this manner, the operations of the DBMS 21 can be controlled by means of the expansion request 6001. In case of the push type (Embodiment 1 and Embodiment 3 described hereinafter), an indication describing that the structured data are placed in the execution nodes 42 by the DBMS 21 is written in the expansion request 6001. In case of the pull type (Embodiment 2), an indication describing how the DBMS 21 keeps the structured data is written in the expansion request 6001. In this case, when the DBMS 21 receives a transmission request from an execution node 42, the DBMS 21 transmits the kept structured data to this execution node 42 in response to the transmission request.

The expansion part [3] of the expansion request 6001 can have the first placement information 521 embedded therein. As shown in FIG. 7, for example, the first placement information 521 can be expressed in markup language such as HTML (HyperText Markup Language) or XML (Extensible Markup Language). Information indicating that the first placement information 521 is divided and transmitted to the DBMS 21 can be written in the expansion part [3] as well (i.e., the first placement information 521 may be divided and transmitted to the DBMS 21 by the management node 44). In addition, the first placement information 521 may be transmitted from the management node 44 to the DBMS 21 as an independent file (data).

In addition to the configuration information on the configurations of the two or more execution nodes 42 (e.g., serial numbers, IP addresses, host names, port numbers), a placement condition of the structured data to be placed in each of the execution nodes 42 (e.g., a condition defined by at least one of one or more structured data attributes such as table names, column names, and values) may be written in the first placement information 521 for each of the two or more execution nodes 42 as shown in FIG. 7. For example, "placement condition" can be expressed by a combination of values that are described in the same column as a column ("category" column, in the present embodiment) configuring the same table as a specific table ("item" table described hereinafter, in the present embodiment). According to the example shown in FIG. 7, row data (structured data) in which the value in the "category" column of the item table says "microwave ovens," is placed in execution node: 1 (the execution node with serial number "1"). As to an execution node without a placement condition established (e.g., execution node: 32), row data other than the row data (structured data) to be placed in an execution node with the placement condition is placed. Placement conditions do not always have to be written in the first placement information 521.

In a case where the placement conditions are not assigned to the execution nodes 42, the DBMS 21 can place identical structured data in the plurality of execution nodes 42 so that the structured data are not delivered between the execution nodes 42. However, such an activity can end up consuming a lot of the storage areas of the plurality of execution nodes 42, resulting in a cost increase. However, by assigning the placement conditions to the execution nodes 42 as described above, the identical structured data do not need to be unnecessarily placed in many execution nodes 42. Although the present invention aims to ensure reliability of the distributed processing system 101, it is sufficient that, for example, the identical structured data be placed in two execution nodes 42, i.e., a currently used execution node 42 and a standby execution node 42.

The analysis unit 211 converts the first placement information 521 shown in FIG. 7 (unstructured data) into the second placement information 522 shown in FIG. 8 (structured data). The second placement information 522 may be kept integrally as shown in FIG. 8 or kept separately. The second placement information 522 shown in FIG. 8 have row data (records) with respect to the execution nodes. In the row data, NO 811 represents the serial numbers, IP 812 represents the IP addresses, HOST 813 represents the host names (node names), PORT 814 represents the port numbers, TABLE 815 represents the table names, COLUMN 816 represents the column names, and VALUE 817 represents the values. In row data, the TABLE 815, the COLUMN 816 and the VALUE 817 are the information representing the placement conditions. In the first placement information 521, either "IP" or "HOST" can be omitted. Therefore, the second placement information 522 has row data that do not have either the IP 812 or the HOST 813 setup. In the first placement information, "NO" and "PORT" may be omitted.

The second placement information 522 do not always have the placement conditions written therein. This is because there exist some first placement information 521 that do not have the placement conditions written therein. Specifically, in this case, the first placement information are simple first placement information that include the configuration information of the execution nodes but do not include any placement conditions. After receiving the simple first placement information, the analysis unit 211 creates the second placement information from the simple first placement information. The second placement information created from the simple first placement information can be called "simple second placement information."

A method for creating the second placement information 522 when at least one of the configuration information items of the execution nodes is omitted is omitted from the first placement information 521 is as follows, for example. In a case where "NO" of a certain execution node 42 is omitted from the first placement information 521, the analysis unit 211 counts the number of "NODE" tags and sets an appropriate value (e.g., a count value) as the NO 811 of this execution node 42 in the second placement information 522. In a case where "PORT" of a certain execution node 42 is omitted from the first placement information 521, the analysis unit 211 sets a predetermined default value as the PORT 814 of this execution node 42 in the second placement information 522. In the example shown in FIG. 8, the default value of the PORT 814 is "30000." In a case where "IP" of a certain execution node 42 is present in the first placement information 521 but "HOST" of the same is omitted from the first placement information 521, the analysis unit 211 leaves the field of the HOST 813 of this execution node blank (e.g., sets a NULL value). In a case where "IP" of a certain execution node is omitted but "HOST of the same is present, the analysis unit 211 access a DNS (Domain Name System) server or the like, determines the IP address corresponding to this "HOST," and sets this IP address as the IP 812 of this execution node in the second placement information 522. If unable to determine the IP address from the written "HOST," the analysis unit 211 returns "error" (or "exception," when a JDBC is used) to the source of the first placement information 521. In a case where both "IP" and "HOST" of a certain execution node are omitted from the first placement information 521, the analysis unit 211 similarly returns "error" (or "exception," when a JDBC is used).

After creating the second placement information 522, the analysis unit 211 executes the creation unit 212.

As described above, the creation unit 212 determines the number of jobs to be executed and a process to be allocated to each of the jobs, based on the result of the analysis by the analysis unit 211 and the second placement information 522. In so doing, in order for two or more acquisition sources corresponding to two or more acquisition processes not to be allocated to the same page (so that the pages of the acquisition sources do not overlap), pages are allocated to the acquisition processes.

Figure 10:
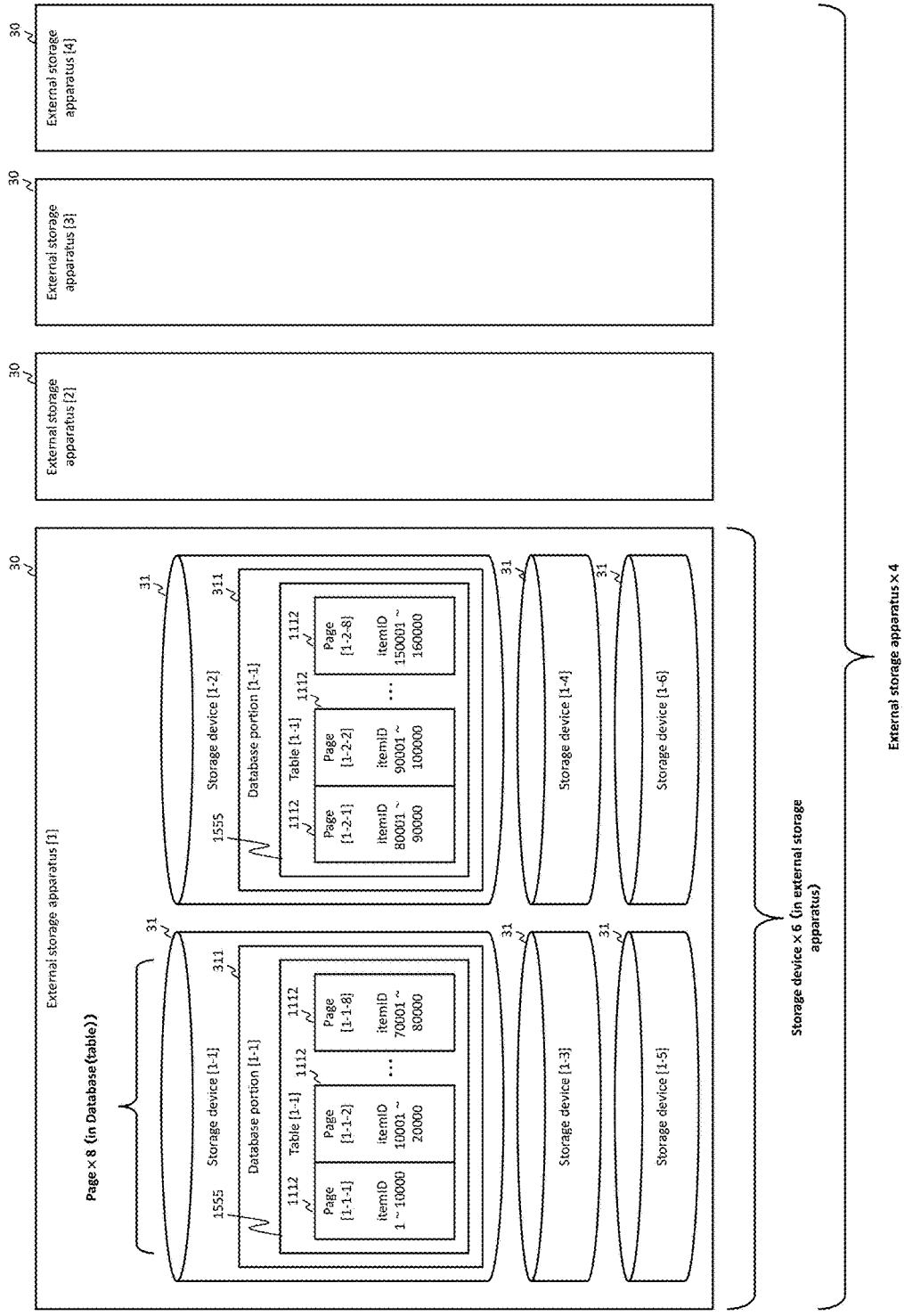
FIG. 10 shows an example of storage of the table shown in FIG. 9.

FIG. 9 shows an example of the item table that includes row data acquired according to the reference request 1004 in the expansion request 6001 shown in FIG. 6. FIG. 10 shows an example of storage of the table shown in FIG. 9.

An item table 901 shown in FIG. 9 has row data for each product. The row data include item ID 911 (identifiers of the products), category 912 (categories of the products), maker 913 (sellers of the products), price 914 (prices of the products), and stock 915 (quantities of stocks of the products).

As shown in FIG. 10, the item table 901 covers a plurality of storage devices 31 of at least one external storage apparatus 30. An area for storing structured data managed by the DBMS 21 is generically called "data area," hereinafter. This "data area" means at least one of the following: the external storage apparatus 30, storage devices 31, database 998, database portions 311, table areas 1555, and pages 1112. One database portion 311 is allocated to one storage device 31. Furthermore, one table area (one table (e.g., the item table 901) is placed with respect to a plurality of table areas 1555) is allocated to one database portion 311. The table areas 1555 are each configured with eight pages 1112. The term "page" means an example of a database element and is a unit of data acquired by the DBMS 21 with one I/O request. One page 1112 is configured with a plurality of (10,000, according to the example shown in FIG. 10) row data that are divided according to the value of "item ID." Specifically, in the present embodiment, the DBMS 221 can acquire 10,000 row data from the item table 901 with one I/O request. One external storage apparatus 30 has six storage devices 31. In other words, in the present embodiment, 1.92 million row data of the item tables 901 are stored in four external storage apparatuses 30.

Figure 11:
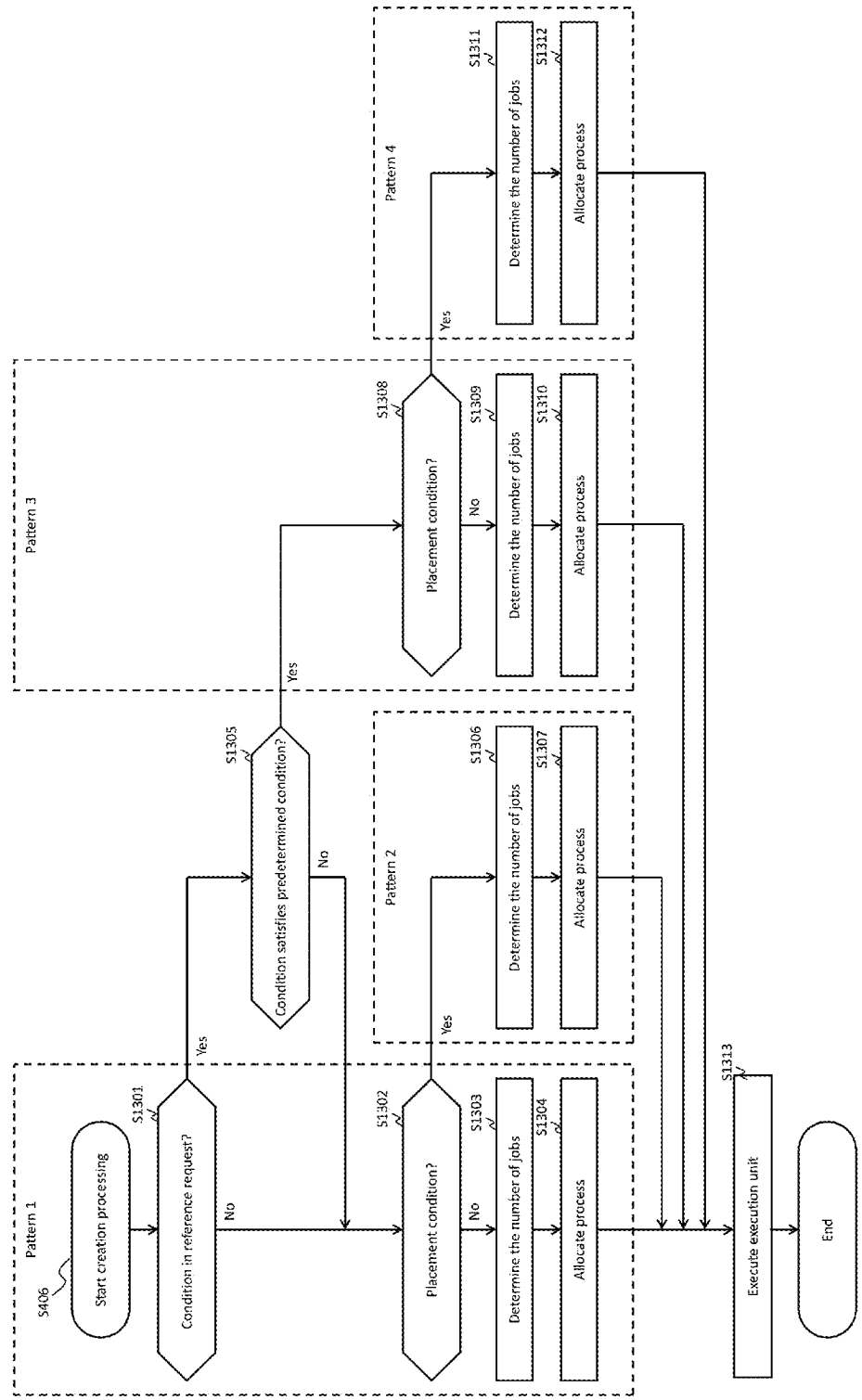
FIG. 11 shows a flow of a creation process (S406 of FIG. 4).

FIG. 11 shows a flow of the creation process (S406 of FIG. 4).

From the result of the analysis of the reference request 1004 (the result of the analysis created by the analysis unit 211), the creation unit 212 determines whether a condition is set in the reference request or not (S1301). The condition set in the reference request 1004 is referred to as WHERE phrase, in the present embodiment.

In a case where the result of the determination in S1301 is negative (S1301: No), the creation unit 212 determines whether or not a placement condition is set for each of the execution nodes described in the second placement information 522 (S1302).

In a case where the result of the determination in S1302 is negative (S1302: No), the creation unit 212 determines the number of jobs to be executed (S1303), determines the process to be allocated to each of the jobs, allocates the determined process to each of the jobs (S1304), and executes the execution unit 213 (S1313), based on a patter in which the result of the determination in S1301 is negative (or the result of the determination in S1305 described below is negative although the result of the determination in S1301 is positive) and the result of the determination in S1302 is negative (pattern 1). As a result of S1303 and S1304, an execution plan is created. In S1304, acquisition source pages 1112 are allocated to the jobs for executing the acquisition process. The jobs for executing the acquisition process are allocated pages 1112 different from the pages 1112 allocated to other jobs for executing the acquisition process. In other words, the same pages 1112 are not allocated to different jobs. Therefore, two or more acquisition processes can be executed in parallel and asynchronously. Furthermore, in S1304, the execution nodes as the placement destinations are allocated to the jobs for executing the placement process. Note that the jobs for executing the acquisition process can be the acquisition jobs or acquisition/placement jobs. The jobs for executing the placement process can be the placement jobs or acquisition/placement jobs.

In a case where the result of the determination in S1302 is positive (S1302: Yes), the creation unit 212 determines the number of jobs to be executed (S1306), determines the process to be allocated to each of the jobs, allocates the determined process to each of the jobs (S1307), and executes the execution unit 213 (S1313), based on a patter in which the result of the determination in S1301 is negative (or the result of the determination in S1305 described below is negative although the result of the determination in S1301 is positive) and the result of the determination in S1302 is positive (pattern 2). As a result of S1306 and S1307, an execution plan is created. In S1307, pages 1112 are allocated to the jobs for executing the acquisition process, and the execution nodes as the placement destinations are allocated to the jobs for executing the placement process. Note that the jobs for executing the acquisition process are the acquisition jobs. The jobs for executing the placement process are the placement jobs.

In a case where the result of the determination in S1301 is positive (S1301: Yes), the creation unit 212 determines whether or not the condition (WHERE phrase) includes a condition on a specific attribute ("item ID," in the present embodiment) concerning a storage rule for storing data in the data areas (S1305). In a case where the result of the determination in S1305 is negative (S1305: No), S1302 is executed.

In a case where the result of the determination in S1305 is positive (S1305: Yes), the creation unit 212 performs the same determination as in S1302 (S1308).

In a case where the result of the determination in S1308 is negative (S1308: No), the creation unit 212 determines the number of jobs to be executed (S1309), determines the process to be allocated to each of the jobs, allocates the determined process to each of the jobs (S1310), and executes the execution unit 213 (S1313), based on a pattern in which the result of the determination in S1305 is positive and the result of the determination in S1308 is negative (pattern 3). As a result of S1309 and S1310, an execution plan is created. In S1310, pages 1112 are allocated to the jobs for executing the acquisition process, and the execution nodes as the placement destinations are allocated to the jobs for executing the placement process. Note that the jobs for executing the acquisition process can be the acquisition jobs or acquisition/placement jobs. The jobs for executing the placement process can be the placement jobs or acquisition/placement jobs.

In a case where the result of the determination in S1308 is positive (S1308: Yes), the creation unit 212 determines the number of jobs to be executed (S1311), determines the process to be allocated to each of the jobs, allocates the determined process to each of the jobs (S1312), and executes the execution unit 213 (S1313), based on a pattern in which the result of the determination in S1305 is positive and the result of the determination S1308 is also positive (pattern 4). As a result of S1311 and S1312, an execution plan is created. In S1312, pages 1112 are allocated to the jobs for executing the acquisition process, and the execution nodes as the placement destinations are allocated to the jobs for executing the placement process. Note that the jobs for executing the acquisition process are the acquisition jobs. The jobs for executing the placement process are the placement jobs.

As described above, based on whether or not the condition on the specific attribute is designed in the reference request (S1301 and S1305) and whether or not the second placement information includes the placement conditions for the respective execution nodes (S1302, S1308), the process correspond to any of the plurality of patterns, and the types of the jobs to be executed (the acquisition/placement jobs or the acquisition jobs and placement jobs), the number of jobs to be executed, and the process to be allocated to each of the plurality of jobs, are determined based on the corresponding pattern. Accordingly, obtaining the appropriate types and number of jobs to be executed can be expected. Because the placement conditions do not always have to be included in the second placement information, S1302 and S1308 do not always have to be executed. In this case, the patterns 2 and 4 are not necessary. In a case where the configuration of the reference request is already determined and the results of S1301 and S1305 do not have to be determined, the pattern 1 and the pattern 3 may be identical or the pattern 2 and the pattern 4 may be identical.

The patterns 1 to 4 are described hereinafter in detail. The following description employs the examples shown in FIGS. 9 and 10.

<Pattern 1>

The reference request 1004 is a reference request in which the condition (WHERE phrase) is not set (the reference request that leads to the negative result of the determination in S1301) 1004 or a reference request in which the WHERE phrase is set but the WHERE phrase for a specific attribute ("item ID," in the present embodiment) on the storage rule for storing data in the data areas is not set (the reference request that leads to the positive result of the determination in S1301 and the negative result of the determination in S1305) 1004. The following (a) is an example of the former reference request 1004, and the following (b) is an example of the latter reference request 1004.

(a) SELECT*FROM item
(b) SELECT*FROM item WHERE item.stock>=10

In the pattern 1, the placement conditions are not set in the second placement information 522.

In case of the pattern 1, the acquisition process and the placement process can be executed by a single job (acquisition/placement job). Employing the acquisition/placement job can cut the number of jobs to be executed. The number of acquisition/placement jobs may be equal to or larger than or smaller than the number of execution nodes 42 (e.g., the currently used execution nodes 42). In the present embodiment, the number of acquisition/placement jobs to be determined in the pattern 1 is thirty-two, the same as the number of execution nodes 42 of the parallel distributed processing infrastructure 301 (e.g., the execution nodes 42 that can be the placement destinations, such as the currently used execution nodes 42). For the explanatory convenience, the following description assumes that serial numbers 1 to 32 are allocated to the thirty-two acquisition/placement jobs, wherein, for example, the acquisition/placement job with serial number [1] is referred to as "acquisition/placement job [1]." In addition, the page 1112 with number [1-1-1] is referred to as "page [1-1-1]."

The creation unit 212 allocates the acquisition source pages 1112 to the acquisition/placement jobs respectively. For example, each of the acquisition/placement jobs may be allocated the same number (same quantity) of pages 1112 and the pages 1112 that are not allocated to any of the other placement/acquisition jobs (the size of respective pages 1112 may be the same). Specifically, for example, the acquisition/placement job [1] may be allocated six pages [1-1-1] to [1-1-6], and the acquisition/placement job [2] may be allocated another six pages [1-1-7], [1-1-8], and [1-2-1] to [1-2-4]. One acquisition/placement job may be allocated continuous pages 1112 or non-continuous pages 1112.

The creation unit 212 allocates the execution nodes, which are the placement destinations having the acquired structured data placed therein, to the respective acquisition/placement jobs. In the present embodiment, because the number of acquisition/placement jobs is equal to the number of execution nodes, the ratio between the number of acquisition/placement jobs to be allocated and the number of execution nodes may be 1:1. It is conceivable that the acquisition/placement jobs acquire the structured data from the allocated pages 1112 and use the work area 26 on the main storage device 51 as a temporary storage area for storing the acquired structured data (the data to be placed in the allocated execution nodes). However, the size of the work area 26 is limited. The acquisition/placement jobs, therefore, need to place the structure data as appropriate from the work area 26 into the execution nodes 42, once the amount of data stored in the work area 26 reaches a certain amount or higher. For each of the jobs, the capacity of the temporary storage area (the area in the work area 26) to be allocated and the time to place the data (e.g., when the utilization of the temporary storage area becomes Y % or higher) may be described in definition information of the DBMS 21. Allocation of the temporary storage area to an acquisition/placement job is also executed by the creation unit 212. Note that "the utilization of the temporary storage area" is the ratio of a total amount of row data stored in the temporary storage area to the capacity of the temporary storage area.

<Pattern 2>

The corresponding reference request 1004 is the same as that of the pattern 1. However, the pattern 2 is different from the pattern 1 in that the placement conditions are set in the second placement information 522.

In a case where the placement conditions are set, the acquisition jobs and the placement jobs are employed in place of the acquisition/placement jobs. Because the jobs for executing the acquisition process and the jobs for executing the placement process are independent from each other, appropriate parallel processing can be expected by adjusting the number of each type of jobs. The number of placement jobs may be thirty-two, the same as the number of execution nodes 42 of the parallel distributed processing infrastructure 301 (e.g., the execution nodes 42, such as the currently used execution nodes 42, which can be the placement destinations). The number of acquisition jobs may be 192, the same as the number of pages 1112 in the item table. As to the definition of the DBMS 21, in a case where there exists an upper limit in the number of jobs that can be executed simultaneously, the number of acquisition jobs may dynamically be adjusted by the creation unit 212 such that, for example, the number obtained by subtracting the number of placement jobs from the upper limit of the number of jobs becomes the number of acquisition jobs. Moreover, in a case where the upper limit of the number of jobs is smaller than the number of execution nodes, the number of placement jobs may be equal to the number of jobs to be executed, so that the number of jobs capable of executing the processes in parallel becomes as high as possible. In the description of the pattern 2, the number of placement jobs is thirty-two, and the number of acquisition jobs is sixty-four.

The creation unit 212 allocates the pages 1112 to the respective acquisition jobs and the placement destination execution nodes to the respective placement jobs. In this regard, other than the fact that the acquisition/placement jobs are replaced with the acquisition jobs and the placement jobs, the rest of the pattern 2 may be the same as that of the pattern 1. For example, the pages 1112 may be allocated to the respective acquisition jobs in such a manner that the number of pages 1112 to be allocated is substantially equal and the acquisition source pages 1112 do not overlap in the other acquisition jobs.

The creation unit 212 determines the association between an acquisition job and a placement job, i.e., which one of the acquisition jobs stores the acquired row data (structured data) into the temporary storage area allocated to a placement job. The creation unit 212 creates a placement job correspondence table 1400 (see FIG. 12) based on the second placement information in which placement conditions are set and the result of allocating the execution nodes to the placement jobs. The placement job correspondence table 1400 is created by adding a "job ID" column to the second placement information (table). Job IDs are identifiers of the placement jobs. The acquisition jobs can figure out which one of the placement jobs that the acquired row data is to be stored in (the temporary storage area corresponding to the placement job), by referring to the placement job correspondence table 1400.

<Pattern 3>

The reference request 1004 is a reference request (the reference request that leads to the positive result of the determination in S1305) 1004 in which is set the condition (WHERE phrase) on a specific attribute ("item ID," in the present embodiment) concerning the storage rule for storing data into the data areas. Examples of such reference request 1004 are, for example, the following (c) and (d).

(c) SELECT*FROM item WHERE item.itemID>960000 AND item.stock>=10

(d) SELECT*FROM item WHERE item.itemID>100000 AND item.itemID<=260000

In the pattern 3, placement conditions are not set in the second placement information 522.

The processes performed in the pattern 3 are basically the same as those of the pattern 1. For example, according to the reference request (c), the number of pages 1112 to be allocated becomes half the number of pages 1112 to be allocated in the pattern 1, depending on the conditions. Consequently, the number of pages 1112 to be allocated to the acquisition/placement jobs is reduced, but nothing else about the pattern 3 is different from the pattern 1.

According to the reference request (d), on the other hand, there are sixteen pages 1112 to be allocated, pages [1-2-3] to [1-4-2]. This number is equal to or smaller than the number of execution nodes (thirty-two). In such a case, unlike the execution plan based on any of the reference requests (a) to (c), the acquisition jobs and the placement jobs execute the acquisition process and the placement process. Specifically, for example, let it be assumed that the number of placement jobs is thirty-two and the number of acquisition jobs is sixteen. In the pattern 3, because no placement conditions are set in the first placement information 521, the placement job correspondence table 1400 cannot be created, raising the need to cause the creation unit 212 to explicitly associate the acquisition jobs with the placement jobs. In so doing, for example, the creation unit 212 creates an execution plan that indicates that a first acquisition jobs of the sixteen acquisition jobs alternately switches between first and second placement jobs out of the thirty-two placement jobs as the placement destinations of the row data.

<Pattern 4>

The reference request 1004 is a reference request (the reference request that leads to the positive result of the determination in S1305) 1004 in which is set the condition (WHERE phrase) on a specific attribute ("item ID," in the present embodiment) concerning the storage rule for storing data into the data areas. In a pattern 4, the placement conditions are set in the second placement information 522.

Because the placement conditions are set in the second placement information 522, the processes of the pattern 4 are the same as those of the pattern 2.

As described above, the creation unit 212 executes the execution unit 213 after creating the execution plans (S1313).

FIG. 13 shows a flow of the execution process (S407 of FIG. 4).

From the execution plans, the execution unit 213 prepares a designated number of acquisition jobs and a designated number of placement jobs or acquisition/placement jobs (S1501).

When the prepared jobs are acquisition/placement jobs (S1502: Yes), the execution unit 213 executes each of the acquisition/placement jobs (S1503). Two or more acquisition/placement jobs may be executed in parallel. On the other hand, when the prepared jobs are acquisition jobs and placement jobs (S1502: No), the execution unit 213 executes each of the acquisition jobs and each of the placement jobs (S1504 and S1505). Two or more acquisition jobs and two or more placement jobs may be executed in parallel.

The execution unit 213 transmits the results of the processes based on the results of the respective jobs, to the management node 44, the source of the reference request 1004 (processing request 1002) (S1506). The process results may indicate "successful" or "abnormal," for example, and do not include the structured data that are acquired from the database 998 at least by the acquisition process. This is because such structured data are placed from the DBMS 21 directly into the execution nodes 42 by the DBMS 21 (placement process).

Figure 14:
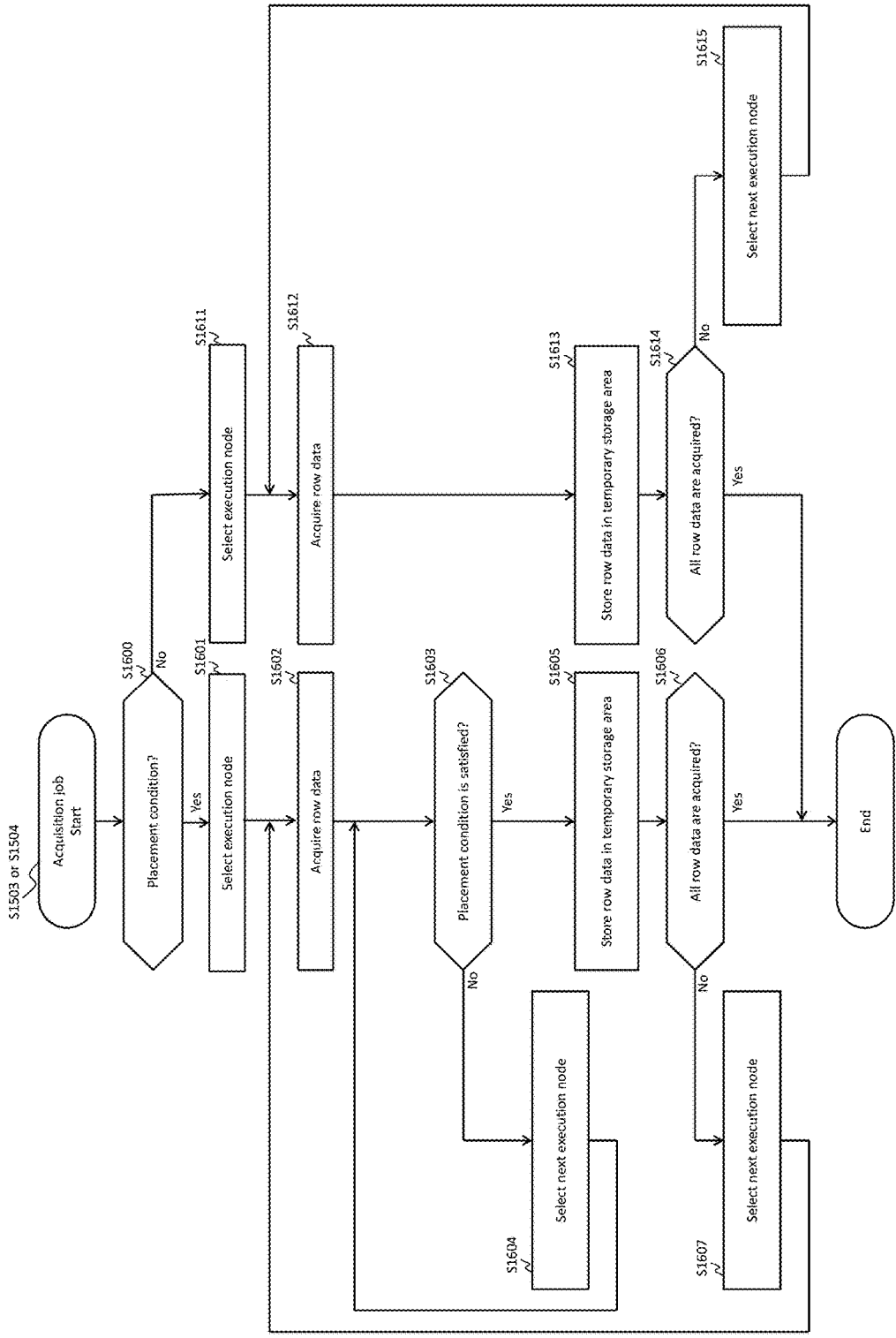
FIG. 14 shows a flow of an acquisition process (S1503 or S1504 of FIG. 13).

FIG. 14 shows a flow of the acquisition process (S1503 or S1504 of FIG. 13).

The acquisition jobs execute S1601 to S1607 if the placement conditions are set in the second placement information 522 (S1600: Yes), and execute S1611 to S1615 if the placement conditions are not set in the second placement information 522 (S1600: No).

<In a Case where the Placement Conditions are Set in the Second Placement Information 522>

The acquisition jobs select any of the execution nodes from the placement job correspondence table (S1601) and acquire the row data from the allocated pages 1112 (S1602). The acquired row data are an example of the structured data complying with the condition designated by the reference request. The acquisition jobs determine whether or not the acquired row data comply with the placement conditions corresponding to the selected execution node (S1603). When the result of the determination in S1603 is negative (S1603: No), the acquisition jobs select the next execution node from the placement correspondence table (S1604) and executes S1603 again. When the result of the determination in S1603 is positive (S1603: Yes), the acquisition jobs store the row data in the temporary storage area of the placement job to which the selected execution node is allocated (S1605). In a case where there exist unacquired row data in the pages 1112 allocated to the acquisition jobs (S1606: Yes), the acquisition jobs select the next execution node from the placement job correspondence table (S1607) and acquire the next row data (S1602). In a case where the unacquired row data do not exit in the pages 1112 allocated to the acquisition jobs (S1606: No), the acquisition jobs are completed.

<In a Case where the Placement Conditions are not Set in the Second Placement Information 522>

In a case where the placement conditions are not set, then the placement job correspondence table 1400 does not exist. Therefore, the acquisition jobs select one execution node from one or more execution nodes (placement jobs) designated beforehand by the creation unit 212 (S1611), acquire the row data from the allocated pages 1112 (S1612), and store the acquired row data in the temporary storage area of the selected placement job (S1613). In a case where there exist unacquired row data in the allocated pages 1112 (S1614: No), the acquisition jobs select another execution node (placement job) different from the previously selected execution node (placement job) (S1615), and store the row data in a similar way. This process is repeated, and when repetition of the process until the row data are stored one at a time in all of the one or more execution nodes (placement jobs) designated beforehand by the creation unit 212 is taken as a first cycle, then, after the first cycle, the process is repeated until all of the row data are stored in the allocated pages 1112 as a result of a second cycle, a third cycle and the like.

Figure 15:
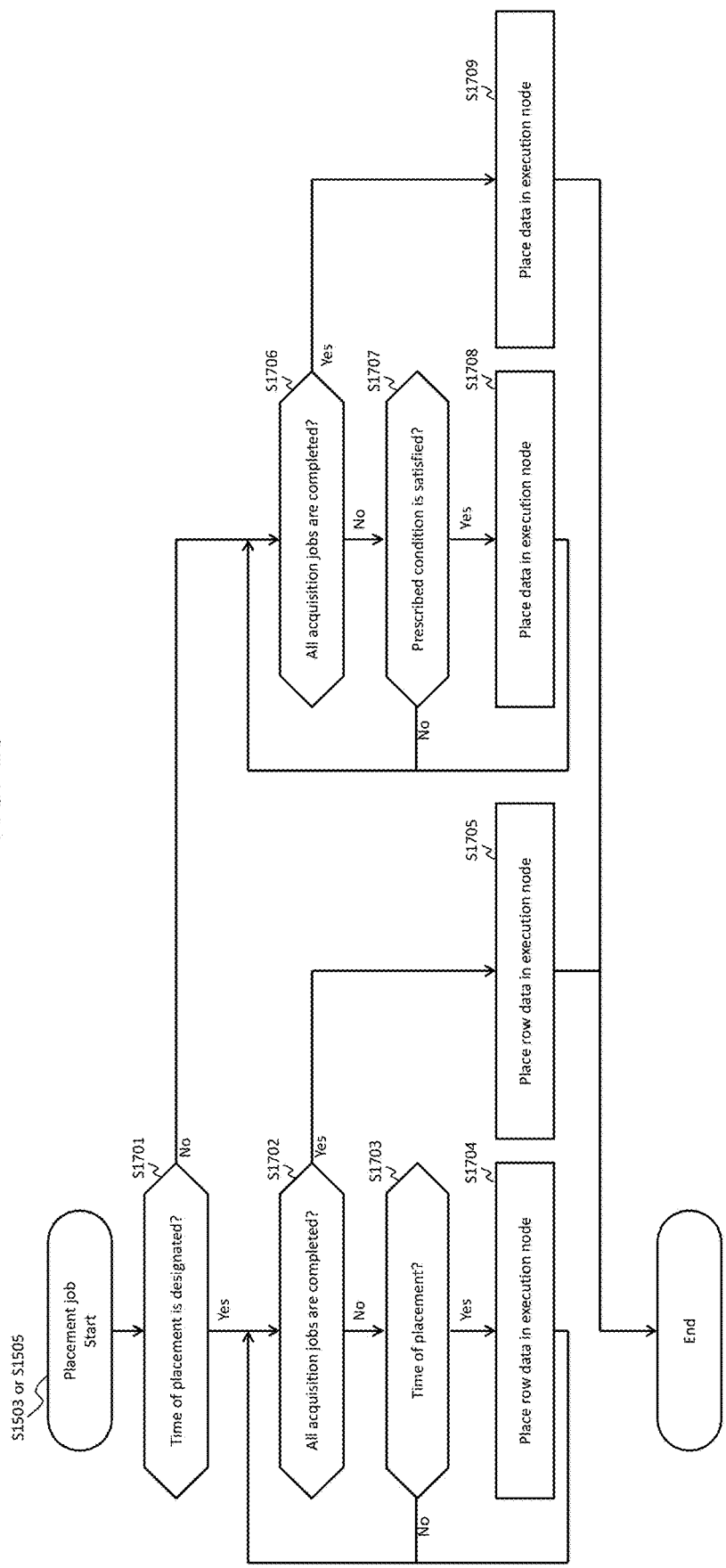
FIG. 15 shows a flow of a placement process (S1503 or S1505 of FIG. 13).

FIG. 15 shows a flow of the placement process (S1503 or S1505 of FIG. 13).

In a case where time of placement is designated (S1701: Yes), the placement jobs execute S1702 to S1705. In a case where time of placement is not designated (S1701: No), the placement jobs execute S1706 to S1709. The time of placement may be defined based on the state of the temporary storage area corresponding to each placement job (e.g., when the utilization of the temporary storage area becomes Y % or higher) or based on the length of time or a clock time.

<In a Case where the Time of Placement is Designated>

The placement jobs determine whether all of the acquisition jobs are completed or not (S1702). When the result of the determination in S1702 is positive (S1702: Yes), the placement jobs place all of the row data of the temporary storage areas corresponding to the same placement jobs, in the execution nodes 42 allocated to these placement jobs (S1705). As a result, the placement jobs are completed.

In a case where the result of the determination in S1702 is negative (S1702: No), the placement jobs determine whether the time of placement is satisfied or not (S1703). In a case where the result of the determination in S1703 is positive (S1703: Yes), the placement jobs place the row data of the temporary storage areas corresponding to these placement jobs into the execution nodes 42 allocated to these placement jobs (S1704), and return to S1702. In a case where the result of the determination in S1703 is negative (S1703: No), the placement jobs return to S1702 without executing S1704.

<In a Case where the Time of Placement is not Designated>

The placement jobs determine whether all of the acquisition jobs are completed or not (S1706). In a case where the result of the determination is S1706 (S1706: Yes), the placement jobs place all of the row data of the temporary storage areas corresponding to these placement jobs, into the execution nodes 42 allocated to these placement jobs (S1709). As a result, the placement jobs are completed.

In a case where the result of the determination in S1706 is negative (S1706: No), the placement jobs determine whether or not a predetermine condition is satisfied by the state (such as the utilization) of the temporary storage areas corresponding to the placement jobs (S1707). In a case where the result of the determination in S1707 is positive (S1707: Yes), the placement jobs place the row data of the temporary storage areas into the execution nodes 42 allocated to the placement jobs (S1708), and return to S1706. In a case where the result of the determination in S1707 is negative (S1707: No), the placement jobs return to S1706 without executing S1708. Note that "predetermined condition" described in this paragraph means a condition that is determined uniquely by the DBMS 21 and is not the "time of placement."

The above has described the processes concerning an acquisition job and a placement job. The processes concerning an acquisition/placement job can be a combination of the process of an acquisition job (FIG. 14) and the process of a placement job (FIG. 15). However, determining whether or not the placement conditions are set in the second placement information 522 is omitted from the combination. This is because such determination is not necessary. In other words, steps S1611 to S1615 are not executed by the acquisition/placement jobs when the result of the determination in S1600 is negative (S1600: No).

Figure 16:
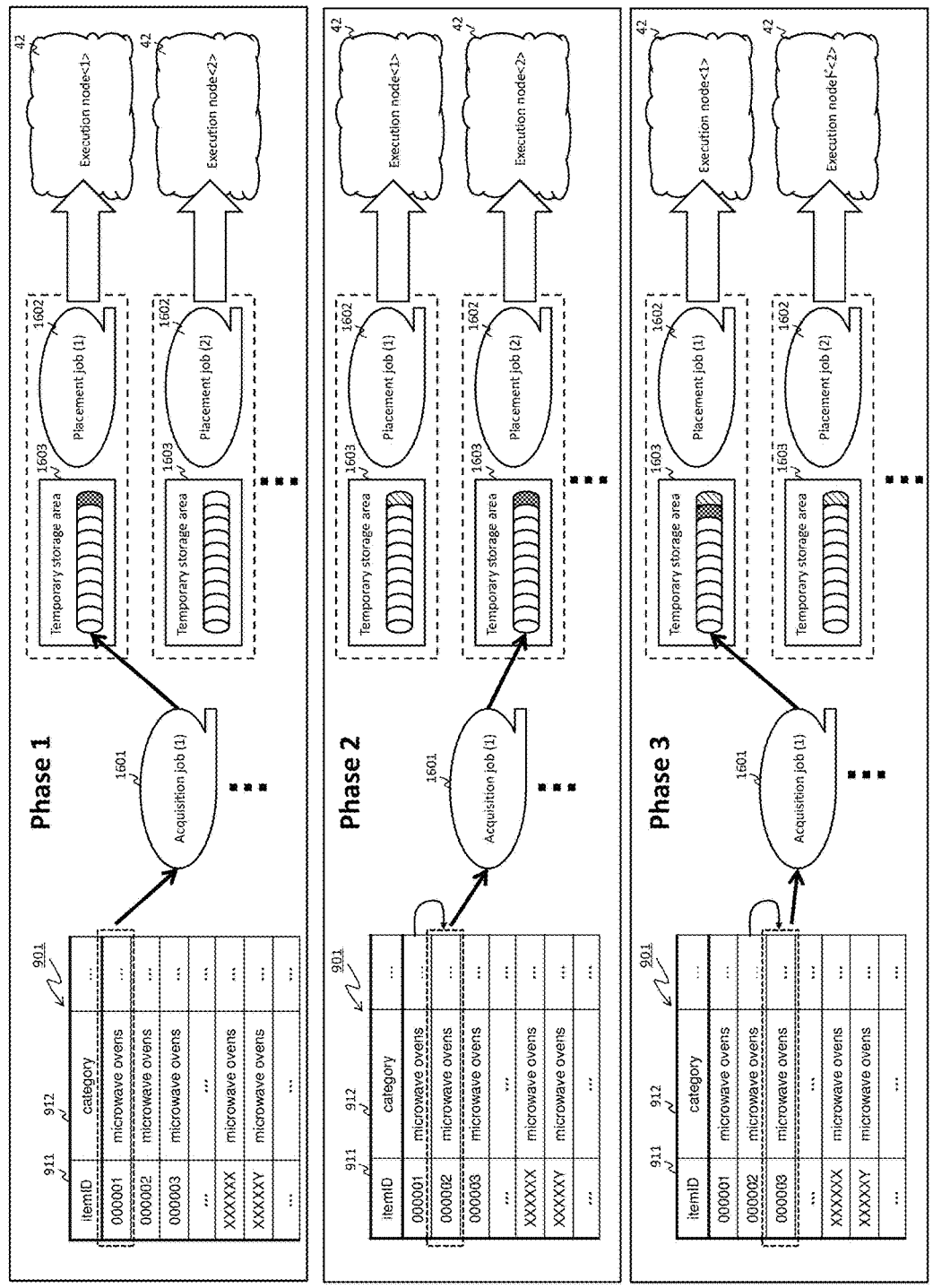
FIG. 16 shows a part of an example of the acquisition process and of an example of a placement process.
Figure 17:
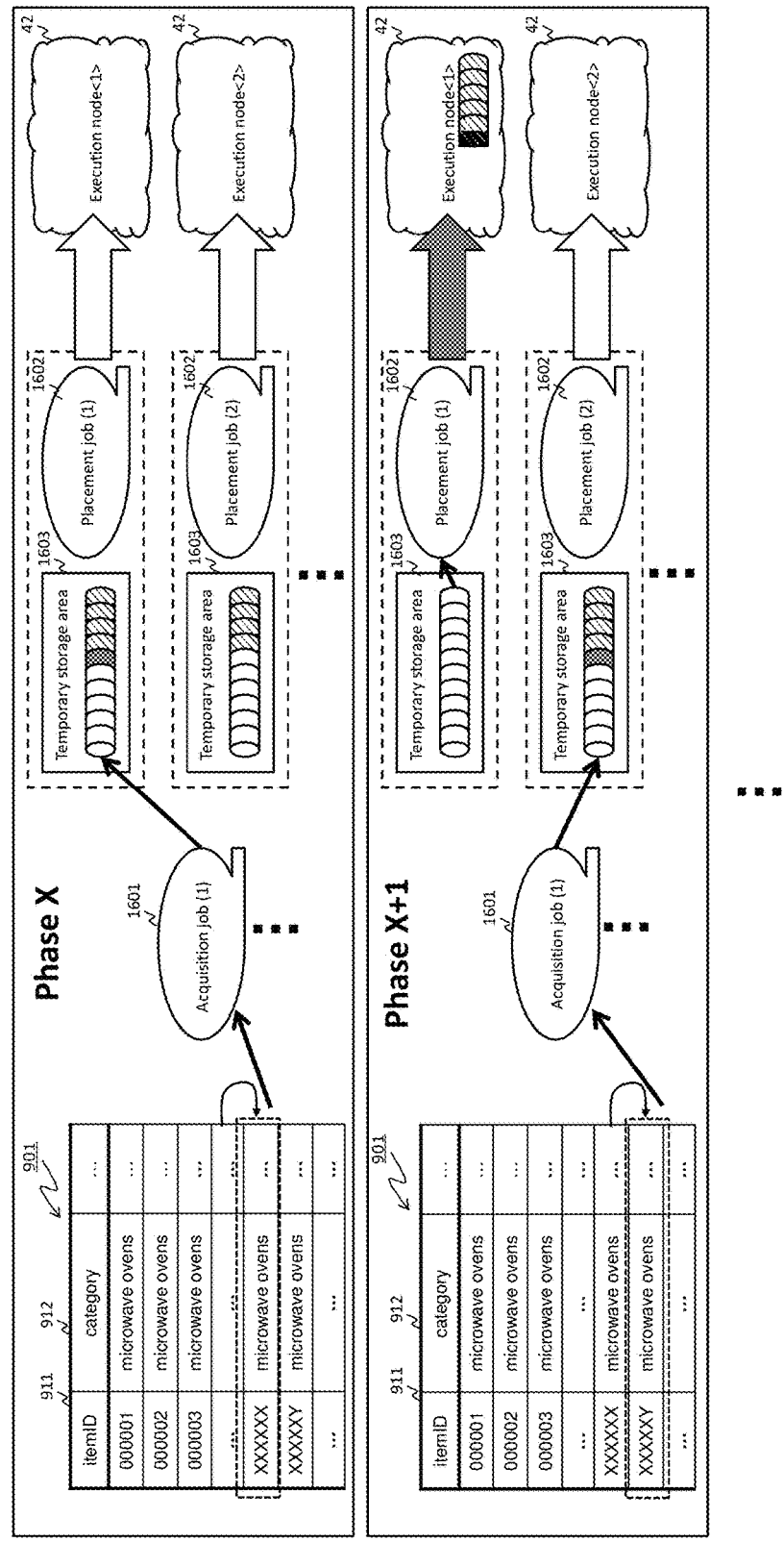
FIG. 17 shows another part of the example of the acquisition process and of the example of the placement process.

According to the foregoing acquisition jobs and the placement jobs, for example, the acquisition process and the placement processes shown in FIGS. 16 and 17, for example, are performed. FIGS. 16 and 17 show the examples of the "case in which the placement conditions are not set in the second placement information 522" and the "case in which the time of placement is designated." Phases 1 to 3, . . . , and phases X and X+1 indicate temporal transitions. Specifically, the acquisition job [1] (acquisition job 1601) acquires row data, one by one, from the page 1112 allocated to the acquisition job [1] and stores the row data in a temporary storage area 1603 of the placement job [1] or [2] (placement job 1602). A plurality of row data are evenly stored in two temporary storage areas 1603 corresponding to the placement jobs [1] and [2]. In the phase X+1, the time of placement is satisfied for the placement job [1] (e.g., the utilization of the temporary storage area exceeds 50%), and the placement job [1] places the row data from the temporary storage area 1603 of the placement job [1] into an execution node [1] (execution node 42) allocated to the placement job [1].

Embodiment 2

Embodiment 2 is now described hereinafter. The differences with Embodiment 1 are mainly described, and descriptions of the similarities between Embodiment 2 and Embodiment 1 are omitted or simplified. For the elements described in Embodiment 2 that correspond to and are completely identical to the elements of Embodiment 1, the same reference numerals as those of the elements of Embodiment 1 are used. For the elements described in Embodiment 2 that correspond to those of Embodiment 1 and for the elements and functions of Embodiment 2 that are different from those of Embodiment 1, an alphabet "B" is added to each of the reference numerals of the elements of Embodiment 1 regardless of whether these elements are shown in the diagrams or not.

An overview of Embodiment 2 is described first.

In Embodiment 2, a DBMS 21B does not actively provide structured data (row data) to an execution node 42B. In Embodiment 2, the DBMS 21B receives a structured data transmission request from the execution node 42B and, in response to the transmission request, transmits the relevant structured data to the execution node 42B. At least in Embodiment 2, providing structured data from the DBMS to an execution node without any request from the execution node is called "placement" of structured data, and providing structured data from the DBMS to an execution node in response to a request from the execution node is called "transmission" of structured data. The terms "placement" and "transmission" may each mean an example of "provision."

Generally speaking, in Embodiment 2, a management node 44B sends, to each of two or more execution nodes 42B, an identifier that is to be designated in a transmission request by each of the execution nodes 42B. Each of the two or more execution nodes 42B transmits, to the DBMS 21B, a transmission request in which an identifier sent from the management node 44B is designated. The DBMS 21B transmits, to each of these execution nodes 42B, structured data that is specified from the identifier designated in the transmission request. The term "identifier" is an identifier that can directly or indirectly specify structured data and may be, for example, an identifier of row data or an identifier allocated to structured data configured as a set of row data. In the following description, a set of row data is called "temporary table." The DBMS 21B (an execution unit 213B) creates the temporary table, and an identifier of this temporary table is designated in the transmission request sent from each execution node 42B. The temporary table is created for each of the execution nodes 42B. For example, the management node 44B causes the DBMS 21B to designate, for each of the execution nodes 42B, an identifier to be allocated to the temporary table of each of the execution nodes 42B, and sends, to each of the two or more execution nodes 42B, an identifier of the temporary table created for the execution node 42B. Sending the identifiers to the respective execution nodes 42B may be equivalent to, for example, transmitting analysis instructions including the identifiers of the temporary tables, from the management node 44B to the execution nodes 42B.

In Embodiment 2, the placement jobs are not required because the DBMS 21B does not place structured data. In Embodiment 2, the execution unit 213B creates a temporary table for each execution node 42B and stores the created temporary tables in the work area 26 or secondary storage device 52. In this manner, the temporary tables are managed by the DBMS 21B for the respective execution nodes 42B. Thereafter, the execution nodes 42B transmit, to the DBMS 21B, transmission requests in which the identifiers designated by the management node 44B are designated. In a case where the DBMS 21B receives from the execution nodes 42B the transmission requests in which the identifiers of the temporary tables are designated, the DBMS 21B transmits, to the execution nodes 42B, the temporary tables specified from the identifiers. Transmission of the transmission requests and transmission of the temporary tables are performed directly between the DBMS 21B and the execution nodes 42B without having the management node 44B therebetween.

In Embodiment 1, the DBMS 21 acquires row data from the database 998 every time when receiving the reference request 1004 from the management node 44. In Embodiment 2, however, row data acquired from the database 998 are managed in the form of temporary tables. Therefore, in Embodiment 2, even when the DBMS 21B repeatedly receives the same reference request 1004, the DBMS 21B does not need to acquire row data from the database 998 each time when receiving the reference request 1004, because the temporary tables are already prepared. Consequently, the time it takes to prepare the structured data to be provided to the execution nodes 42B can be reduced. In Embodiment 1, on the other hand, because necessary structured data are likely to be placed already in the execution nodes 42 (the structured data are likely to be present in the execution servers 40 having the execution nodes 42) when the execution nodes 42 try to execute the analytical processing using the structured data, the time it takes for the execution nodes 42 to execute the analytical processing can possibly be reduced.

Embodiment 2 is described hereinafter in detail.

Embodiment 2 employs first preparation information 521B in place of the first placement information 521 and employs second preparation information 522B in place of the second placement information 522. Of the first and second preparation information 521B and 522B, at least the second preparation information 522B is an example of the control information. The first preparation information 521B may be information in unstructured format that is input from an outside component such as the management node 44B into the DBMS 21B. The second preparation information 522B may be information obtained by converting the first preparation information 521B (information in structured format). The first preparation information 521B does not include information on each of the execution nodes 42B (e.g., the IP address, host name, and port number) but includes, for each temporary table, an identifier of each temporary table and data conditions of the row data included in each temporary table. Therefore, the second preparation information 522B includes, for each temporary table, an identifier of each temporary table (TABLE ID (table ID) 181) and data conditions of the row data included in each temporary table (TABLE (table name) 1812, COLUMN (column name) 1813, and VALUE (value) 1814), as shown in FIG. 18. The data conditions are conditions concerning the row data to be transmitted.

Figure 19:
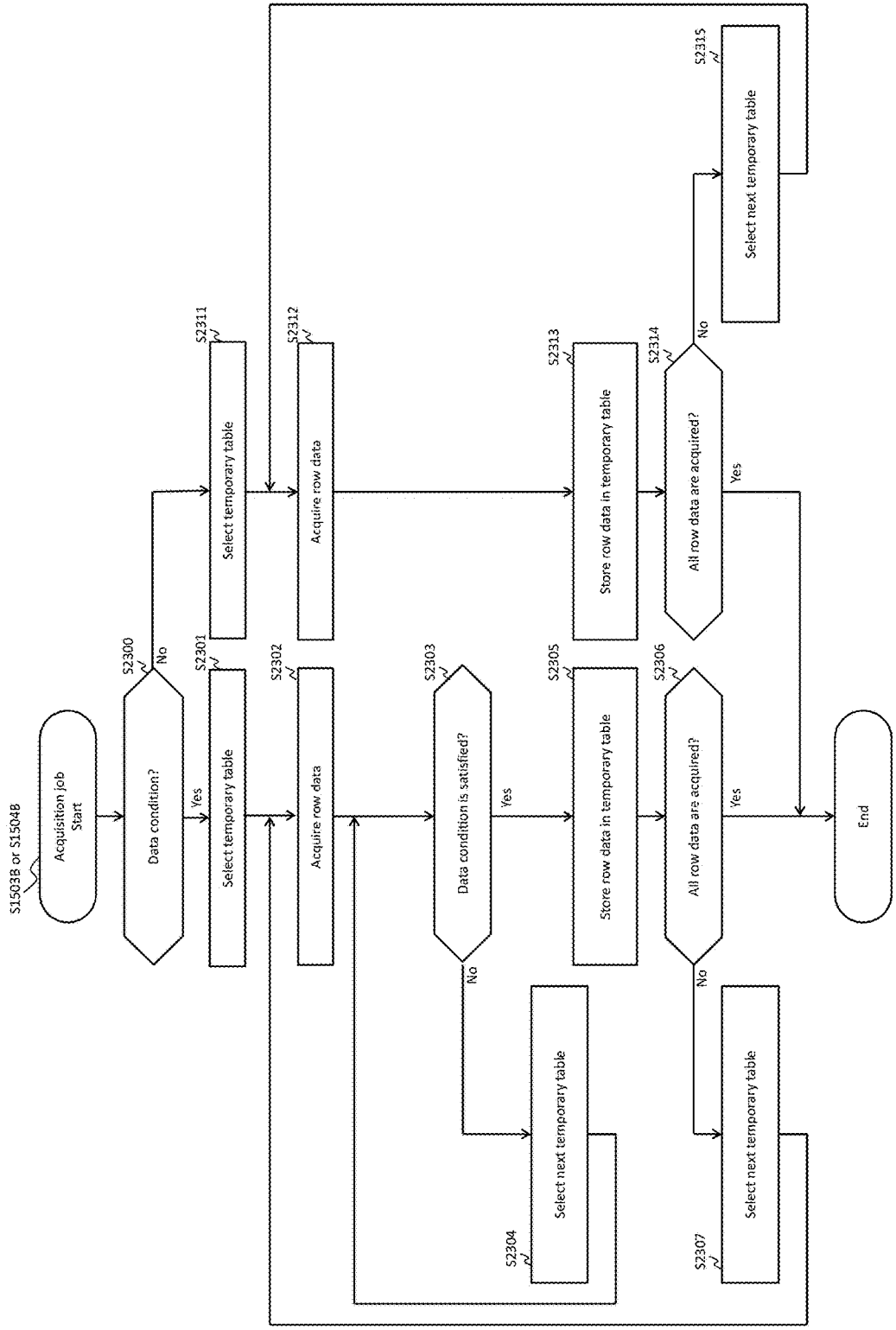
FIG. 19 shows a flow of an acquisition process according to Embodiment 2.

FIG. 19 shows a flow of an acquisition process according to Embodiment 2.

Those skilled in the art can grasp the explanation of the processes concerning the acquisition job according to Embodiment 2 (explanation of FIG. 19) by reading "second placement information 522" as "second preparation information 522B," "placement conditions" as "data conditions," and "storage of row data in the temporary storage areas" as "storage of row data in the temporary tables" in the explanation of the processes concerning an acquisition job according to Embodiment 1 (explanation of FIG. 14). The acquisition job according to Embodiment 2 is described specifically hereinafter.

Specifically, an acquisition job executes S2301 to S2307 if data conditions are set in the second preparation information 522B (S2300: Yes), and executes S2311 to S2315 if data conditions are not set in the second preparation information 522B (S2300: No).

<In a Case where Data Conditions are Set in the Second Preparation Information 522B>

The acquisition job selects any of the TABLE IDs (temporary tables) from the second preparation information 522B (S2301) and acquires row data from the allocated page 1112 (S2302). The acquisition job then determines whether or not the acquired row data comply with the data condition corresponding to the selected temporary table (S2303). In a case where the result of the determination in S2303 is negative (S2303: No), the acquisition job selects the next temporary table from the second preparation information 522B (S2304) and executes S2303 again. In a case where the result of the determination in S2303 is positive (S2303: Yes), the acquisition jobs stores the row data in the selected temporary table (S2305). In a case where unacquired row data are present in the page 1112 allocated to the acquisition job (S2306: Yes), the acquisition job selects the next temporary table from the second preparation information 522B (S2307) and performs S2302. In a case where unacquired row data are not present in the page 1112 allocated to the acquisition job (S2306: No), the acquisition job is completed.

As a result of the foregoing acquisition process, "in a case where data conditions are set in the second preparation information 522B," a temporary table 2000 shown in FIG. 20 is completed. The temporary table 2000 shown in FIG. 20 is a set of row data acquired from a part of the item table (pages 1112) shown in FIG. 9. Therefore, each of the records (row data) in the temporary table 200 has the same attributes as the row data shown in FIG. 9, i.e., an item ID 2011, a category 2012, a maker 2013, a price 2014, and a stock 2015.

<In a Case where Data Conditions are not Set in the Second Preparation Information 522B>

The acquisition job selects any of the TABLE IDs (temporary tables) from the second preparation information 522B (S2311) and acquires row data from the allocated page 1112 (S2312). The acquisition job then stores the acquired row data in the selected temporary table (S2313). In a case where unacquired row data are present in the page 1112 allocated to the acquisition job (S2314: Yes), the acquisition job selects the next temporary table from the second preparation information 522B (S2315) and performs S2312. In a case where unacquired row data are not present in the page 1112 allocated to the acquisition job (S2314: No), the acquisition job is completed. In this case, a plurality of row data are evenly distributed in a plurality of temporary tables.

Embodiment 3

Embodiment 3 is now described hereinafter. In explaining Embodiment 3, the differences between Embodiments 1 and 2 are mainly described and the similarities between Embodiments 1 and 2 are omitted or simplified. For the elements described in Embodiment 3 that correspond to and are completely identical to the elements of Embodiment 1, the same reference numerals as those of the elements of Embodiment 1 are used. For the elements described in Embodiment 3 that correspond to those of Embodiment 1 and for the elements and functions of Embodiment 3 that are different from those of Embodiment 1, an alphabet "C" is added to each of the reference numerals of the elements of Embodiment 1 regardless of whether these elements are shown in the diagrams or not.

An overview of Embodiment 3 is described first.

Figure 21:
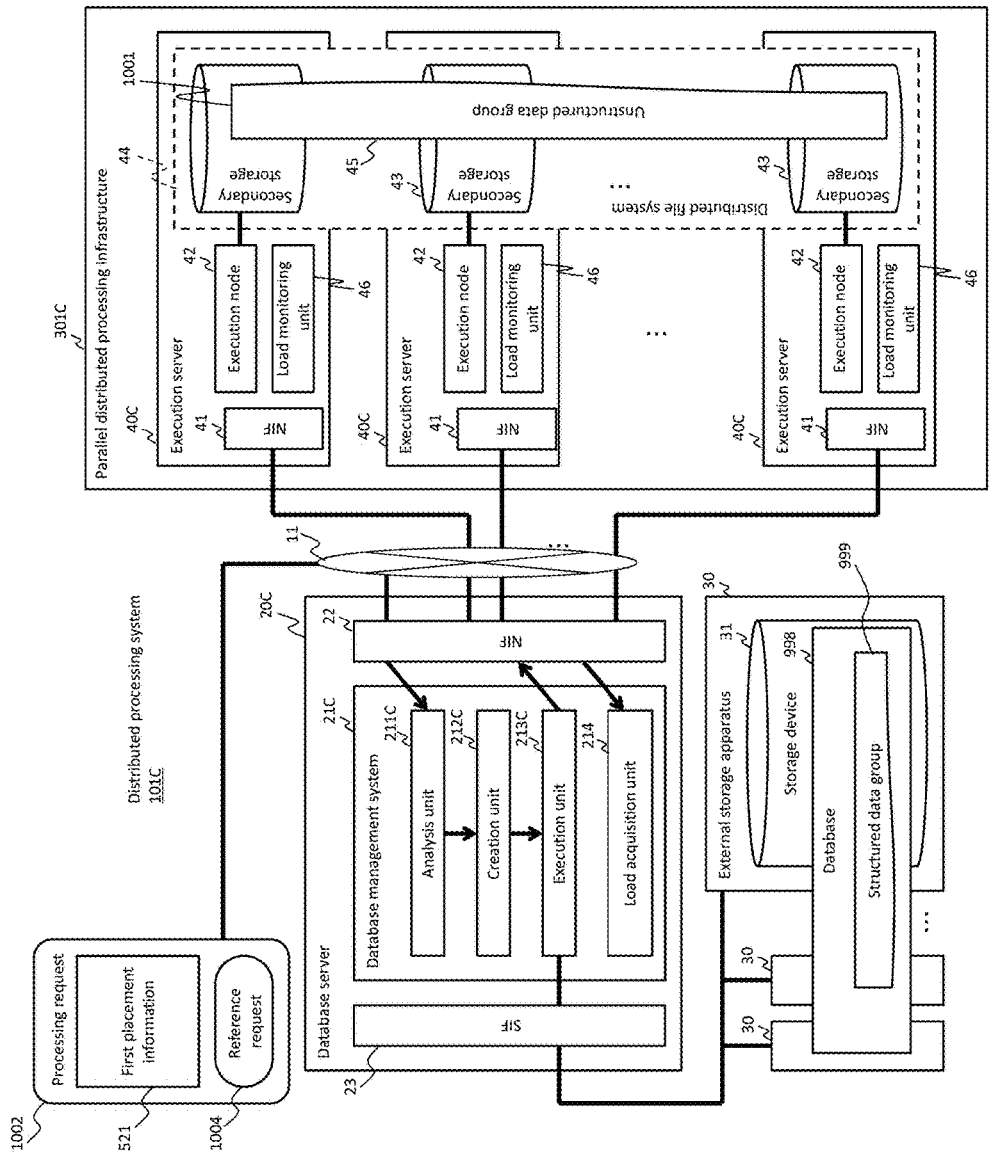
FIG. 21 shows an overview of a distributed processing system according to Embodiment 3.

FIG. 21 shows an overview of a distributed processing system according to Embodiment 3.

In Embodiment 3, each execution server 40C in a distributed processing system 101C further has a load monitoring unit 46. A DBMS 21C further has a load acquiring unit 214. The load monitoring unit 46 may be hardware or a function that is realized by causing a CPU (processor) of the execution server 40C to execute a program. The load monitoring unit 46 monitors load values of the execution server 40C executing the corresponding execution node 42 (e.g., metric values of various metrics such as CPU utilization of the execution server 40C, memory utilization, network traffics, electric power consumption and the like). The load monitoring unit 46 sends the result of monitoring the load values to the load acquiring unit 214 of the DBMS 21C. The load acquiring unit 214 of the DBMS 21C reflects the results of monitoring the load values in load information stored at least in the work area 26 or the secondary storage device 52. The load information represents load values (at least one type of metric value) of each execution node (execution server). The format of the load information may be an unstructured format or a structured format.

In Embodiment 3, the amount of data (total amount of row data) to be placed is controlled for each execution node 42, based on the load of each execution node 42 (execution server 40C). For example, the amount of data is controlled in such a manner that more row data are placed in the execution node 42 of an execution server 40C having a small load than the execution node 42 of an execution server 40C having a large load. As a result, data an amount corresponding to the load of each execution server 40C are placed in the corresponding execution node 42, possibly improving performance of the parallel analytical processing.

Embodiment 3 is now described hereinafter in detail.

Figures 24, 25:
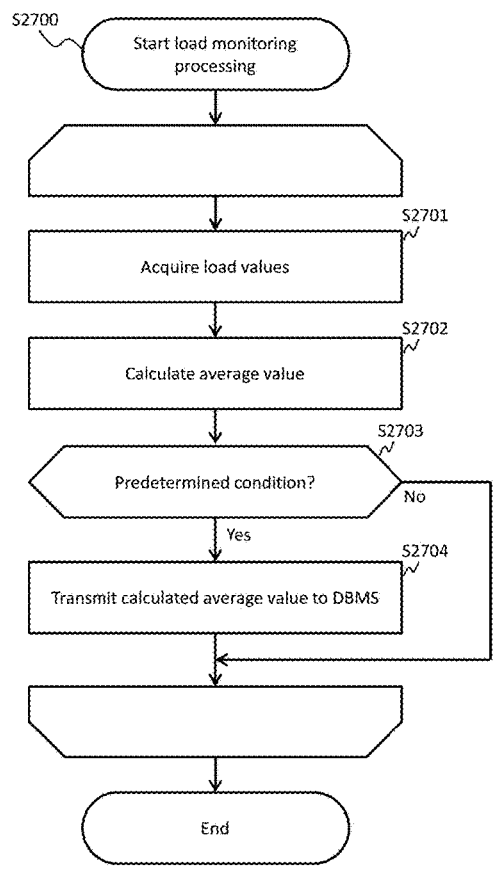
FIG. 24 shows a flow of a load monitoring process.
FIG. 25 shows an example of a placement job correspondence table according to Embodiment 3.

FIG. 24 shows a flow of a load monitoring process.

Once the load monitoring process begins (S2700), the load monitoring unit 46 repeatedly (e.g., periodically) acquires the load values until the DBMS 21C stops or the corresponding execution server 40C having the load monitoring unit 46 disposed therein stops (S2701), and calculates the average value of a plurality of load values of a certain period (S2702). In place of or in addition to the average value, various other values based on the plurality of load values of a certain period may be calculated.

The load monitoring unit 46 determines whether the calculated average value satisfies a predetermined condition or not (S2703). The expression, "the calculated average value satisfies a predetermined condition," may mean, for example, that the calculated average value is equal to or larger than a predetermined value, that the difference between the calculated average value and a value based on one or more average values calculated in the past is equal to or larger than a predetermined difference, or that the degree of increase in the average value that is specified from the calculated average value and one or more average values calculated in the past is equal to or higher than a predetermined degree.

In a case where the result of the determination in S2703 is positive (S2703: Yes), the load monitoring unit 46 transmits the calculated average value to the load acquiring unit 214 of the DBMS 21C.

The above is the load monitoring process. In this process, the interval of acquisition of a load value, the interval of calculating the average value (calculating the average value between a load value of a certain time point and a load value of another certain time point), the timing of acquiring an average value to be compared, and other values may be values chosen by an administrator.

FIG. 22 shows an example of the load information.

Load information 2201 is stored at least in the work area 26 or the secondary storage device 52 and represents load values (at least one type of metric value) of each execution node (execution server), as described above. According to the example shown in FIG. 22, the load information is in the form of a table and has, for each execution node 42 (execution server 40C), a NO (serial number) 2211, an IP (IP address) 2212, and load values (CPU (CPU utilization) 2213, NETWORK (network traffic) 2214, and the like).

When the load acquiring unit 214 of the DBMS 21C receives load values (average values) from the load monitoring unit 46, the load acquiring unit 214 overwrites the received load values (average values) (CPU utilization, network traffic, etc.) in the row corresponding to the execution node 42 of the execution server 40C having this load monitoring unit 46.

FIG. 23 shows an example of second placement information according to Embodiment 3.

Second placement information 522C has, for each execution node 42, a RATIO (placement ratio) 2315 in place of (or in addition to) the placement conditions. The placement ratio of an execution node is a value calculated based on the load values of the execution node (load values specified from the load information). The placement ratio of the execution node is a ratio of the amount of structured data to be placed in the execution node, to a total amount of a plurality of row data placed in a plurality of execution nodes. Specifically, for example, placement ratio: K means the number of times the data are stored out of a prescribed number (e.g., 100 (set arbitrarily)) (0≤K≤100). For example, when K=50, storage of data is skipped every other time. However, this skipping may be performed fifty times successively after storing data fifty times successively, and may be implemented arbitrarily depending on the DBMS 21C. The allocation of the plurality of row data to the plurality of execution nodes 42 is controlled by the control based on the placement ratio.

Each of the processes performed by an analysis unit 211C, creation unit 212C and execution unit 213C according to Embodiment 3 (see FIG. 21) is described next.

The main differences between the analysis unit 211C and the analysis unit 211 according to Embodiment 1 are as follows. In order to create the second placement information 522C, the analysis unit 211C refers to the load information 2201 (see FIG. 22), calculates the placement ratio of each execution node 42 based on the load values of each execution node 42, and creates the second placement information 522C that includes the placement ratio of each execution node 42 (see FIG. 23).

The main differences between the creation unit 212C and the creation unit 212 according to Embodiment 1 are as follows. The creation unit 212C creates a placement job correspondence table 1400C (see FIG. 25) that includes the placement ratio of each execution node 42. The main difference between the placement job correspondence table 1400C and the placement job correspondence table 1400 according to Embodiment 1 (see FIG. 14) is the presence/absence of a RATIO (placement ratio) 2511. The placement job correspondence table 1400C shown in FIG. 25 is a table based on the first placement information 522C in which the placement conditions are not written, and therefore does not include the placement conditions (TABLE 1215, COLUMN 1216, and VALUE 1217) as in the placement job correspondence table 1400 shown in FIG. 14. Embodiment 3 employs the acquisition jobs and the placement jobs but does not employ the acquisition/placement jobs.

The main differences between the execution unit 213C and the execution unit 213 according to Embodiment 1 are as follows. When storing the acquired row data in a temporary storage area 1603, an acquisition job 1601C refers to the placement ratio of the execution node 42 corresponding to this temporary storage area 1603 (the placement ratio 2511 described in the placement job correspondence table 1400C), and determines whether to store the row data in the temporary storage area 1603 or not, based on the placement ratio. In a case where the result of this determination is positive, the acquisition job 1601C stores the row data in the temporary storage area 1603.

Several examples have been described above. However, the present invention is not limited to these examples, and it goes without saying that various changes can be made without departing from the gist of the present invention.

For example, at least two of Embodiments 1 to 3 can be combined. In this case, for example, in a combination of Embodiment 1 and Embodiment 2, the DBMS may create a temporary table including the row data acquired by an acquisition job, and upon reception of a transmission request from an execution node, determine whether or not the data condition corresponding to this execution node (e.g., condition specified from the control information such as the second placement information 522 of Embodiment 1) matches the data conditions corresponding to the temporary table. In a case where the result of this determination is positive, the DBMS may transmit the temporary table to this execution node.

In addition, the present invention can be applied to processing of a request sent from an application other than the analysis application 61 (i.e., processing other than analytical processing).

REFERENCE SIGNS LIST

101 Distributed processing system

The invention claimed is:

1. A data processing system which includes a processor, comprising:
a database management system (called "DBMS," hereinafter) configured to communicate with a plurality of execution nodes that manage an unstructured data group which is a set of one or more unstructured data and execute parallel distributed processing, and configured to manage a database including a structured data group which is a set of one or more structured data; and
a management node configured to communicate with the plurality of execution nodes and the DBMS, and configured to transmit a reference request to the DBMS,
each of the plurality of execution nodes being configured to create data to be processed based on at least one structured data of the structured data group managed by the DBMS and at least one unstructured data of the unstructured data group managed by the plurality of execution nodes, and performing processing using the data to be processed, and
based on control information, which is information about controlling the provision of two or more structured data designated in the reference request, the two or more structured data being configured to be acquired by the DBMS from the database and provided from the DBMS to two or more execution nodes among the plurality of execution nodes;
wherein the control information is placement information which includes information on each of the two or more execution nodes in which the two or more structured data are placed, or preparation information which includes a plurality of identifiers;
wherein if the control information is the placement information, the DBMS is configured to place the two or more structured data in the two or more execution nodes based on the placement information; and wherein if the control information is the preparation information, the DBMS is configured to associate the acquired structured data with each of the identifiers represented by the preparation information, and, upon reception of a transmission request designating any of the plurality of identifiers from any of the two or more execution nodes, transmit the structured data associated with the identifier designated in the received transmission request, to the execution node that transmits the transmission request.

2. The data processing system according to claim 1, wherein the control information is the placement information and the DBMS is configured to:
   determine the number of jobs to be executed and a process to be allocated to each of a plurality of jobs, based on whether or not a condition on a specific attribute out of one or more attributes of structured data is designated in the reference request and whether or not the placement information includes information representing a placement condition which is a condition on the structured data to be placed in each of the two or more execution nodes; and
   execute, in parallel and asynchronously, two or more acquisition processes for acquiring the two or more structured data, and two or more placement processes for placing the acquired two or more structured data in the two or more execution nodes, by executing the plurality of jobs that are allocated the processes.

3. The data processing system according to claim 2, wherein each of the plurality of jobs is configured to, in a case where the placement information does not include the information representing the placement condition, execute an acquisition/placement process that performs both an acquisition process for acquiring structured data and a placement process for placing the acquired structured data in an execution node.

4. The data processing system according to claim 3, wherein
   the database is divided into a plurality of database elements based on a value of the specific attribute,
   the DBMS is configured to allocate two or more database elements that comply with the reference request among the plurality of database elements, to two or more jobs that execute the two or more acquisition processes,
   in a case where at least one of the two or more structured data is present in a database element that is allocated to each of the two or more jobs executing the two or more acquisition processes, the job acquires the structured data from the database element allocated to the job, and
   even when the placement information does not include the information representing the placement condition, and when a condition on the value of the specific attribute is designated in the reference request and the number of database elements corresponding to a value complying with this condition is equal to or smaller than the number of execution nodes, the plurality of jobs are two or more acquisition jobs and two or more placement jobs,
   each of the two or more acquisition jobs is a job that executes the acquisition process for acquiring structured data, and
   each of the two or more placement jobs is a job that executes the placement process for placing the acquired structured data in an execution node.

5. The data processing system according to claim 2, wherein in a case where the placement information includes the information representing the placement condition, the plurality of jobs are two or more acquisition jobs and two or more placement jobs, each of the two or more acquisition jobs being a job that executes the acquisition process for acquiring structured data, and each of the two or more placement jobs being a job that executes the placement process for placing the acquired structured data in an execution node.

6. The data processing system according to claim 1, wherein
   the control information is the placement information which includes information representing a placement condition on the structured data to be placed in each of the two or more execution nodes, and
   the DBMS is configured to place, based on the placement information, each of the two or more structured data in an execution node that is associated with a placement condition with which the structured data complies.

7. The data processing system according to claim 1, wherein
   the control information is the placement information and each of the plurality of execution nodes is based on a physical computer resource,
   the DBMS is configured to determine a placement ratio of each of the two or more execution nodes, the placement ratio of each of the two or more execution nodes being a ratio of an amount of structured data to be placed in the execution node to a total amount of the two or more structured data and being determined based on a load of the physical computer resource of the execution node, and
   the DBMS is configured to control placement of the structured data in each of the two or more execution nodes based on the placement ratio of the execution node.

8. The data processing system according to claim 1, wherein
   the control information is the preparation information which includes, for each identifier, information representing a data condition which is a condition on structured data to be transmitted, and
   the DBMS is configured to, for each of the identifiers represented by the preparation information, associate the structured data complying with the data condition associated with the identifier, out of the acquired two or more structured data.

9. The data processing system according to claim 8, wherein
   the management node is configured to send, to each of the two or more execution nodes, an identifier that is to be designated in the transmission request by the execution node, and
   each of the two or more execution nodes is configured to transmit, to the DBMS, the transmission request designating the identifier, which is sent from the management node.

10. The data processing system according to claim 1, wherein
    the management node is configured to receive a processing request from an analysis application, transmit the reference request based on the processing request to the DBMS, and transmit a processing instruction based on the received processing request to each of the two or more execution nodes,
    each of the two or more execution nodes is configured to receive the processing instruction, create data to be processed based on at least one structured data of the structured data group managed by the DBMS and at least one unstructured data of the unstructured data group managed by the plurality of execution nodes, perform processing using the data to be processed, and send the result of the processing to the management node, and the management node is configured to return, to the analysis application, the results of processes according to two or more parallel distributed processing results received from the two or more execution nodes, respectively.

11. A database management system which includes a processor for managing a database including a structured data group which is a set of one or more structured data, the database management system comprising:

an analysis unit configured to analyze a reference request; and an execution unit configured to acquire, from the database, two or more structured data designated in the reference request, based on control information, which is information about controlling the provision of the two or more structured data, and provide the two or more structured data to two or more execution nodes among a plurality of execution nodes that manage an unstructured data group which is a set of one or more unstructured data and execute parallel distributed processing, each of the plurality of execution nodes being configured to create data to be processed based on at least one structured data of the structured data group managed by the DBMS and at least one unstructured data of the unstructured data group managed by the plurality of execution nodes, and performing processing using the data to be processed;

wherein the control information includes placement information which includes information on each of the two or more execution nodes in which the two or more structured data are placed, or preparation information which includes a plurality of identifiers;

wherein if the control information is the placement information, the DBMS is configured to place the two or more structured data in the two or more execution nodes based on the placement information; and wherein if the control information is the preparation information, the DBMS is configured to associate the acquired structured data with each of the identifiers represented by the preparation information, and, upon reception of a transmission request designating any of the plurality of identifiers from any of the two or more execution nodes, transmit the structured data associated with the identifier designated in the received transmission request, to the execution node that transmits the transmission request.

12. The database management system according to claim 11, wherein the execution unit is configured to:

determine the number of jobs to be executed and a process to be allocated to each of a plurality of jobs, based on whether or not a condition on a specific attribute out of one or more attributes of structured data is designated in the reference request and whether or not the placement information includes information representing a placement condition which is a condition on the structured data to be placed in each of the two or more execution nodes; and execute, in parallel and asynchronously, two or more acquisition processes for acquiring the two or more structured data, and two or more placement processes for placing the acquired two or more structured data in the two or more execution nodes, by executing the plurality of jobs that are allocated the processes.

13. A data processing method, comprising:

receiving a reference request, by a database management system (called "DBMS," hereinafter) configured to communicate with a plurality of execution nodes that manage an unstructured data group which is a set of one or more unstructured data and that is configure to execute parallel distributed processing, and being configure to manage a database including a structured data group which is a set of one or more structured data; each of the plurality of execution nodes being a node which is configured to create data to be processed based on at least one structured data of the structured data group managed by the DBMS and at least one unstructured data of the unstructured data group managed by the plurality of execution nodes, and performing processing using the data to be processed;

acquiring, by the DBMS, based on control information, which is information about controlling the provision of two or more structured data designated in the reference request, the two or more structured data from the database, and providing the two or more structured data to two or more execution nodes among the plurality of execution nodes;

wherein the control information is placement information which includes information on each of the two or more execution nodes in which the two or more structured data are placed, or preparation information which includes a plurality of identifiers;

wherein if the control information is the placement information, the method further comprises placing the two or more structured data in the two or more execution nodes based on the placement information; and wherein if the control information is the preparation information, the method further comprises associating the acquired structured data with each of the identifiers represented by the preparation information, and, upon reception of a transmission request designating any of the plurality of identifiers from any of the two or more execution nodes, transmitting the structured data associated with the identifier designated in the received transmission request, to the execution node that transmits the transmission request.

14. The data processing method according to claim 13, further comprising:

receiving, by the management node, a processing request from an application, transmitting the reference request based on the processing request to the DBMS, and transmitting a processing instruction based on the received processing request to each of the two or more execution nodes; and receiving, by the management node, from each of the two or more execution nodes, the result of processing performed by the execution node, and outputting a result according to two or more processing results received from the two or more execution nodes, respectively.

* * * * *